US012120012B2

(12) United States Patent
Guim Bernat et al.

(10) Patent No.: US 12,120,012 B2
(45) Date of Patent: *Oct. 15, 2024

(54) DYNAMIC QUALITY OF SERVICE IN EDGE CLOUD ARCHITECTURES

(71) Applicant: Intel Corporation, Santa Clara, CA (US)

(72) Inventors: Francesc Guim Bernat, Barcelona (ES); Andrew J. Herdrich, Hillsboro, OR (US); Karthik Kumar, Chandler, AZ (US); Felipe Pastor Beneyto, Holmdel, NJ (US); Edwin Verplanke, Chandler, AZ (US); Rashmin Patel, Chandler, AZ (US); Monica Kenguva, Phoenix, AZ (US); Brinda Ganesh, Portland, OR (US); Alexander Vul, San Jose, CA (US); Ned M. Smith, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 188 days.

This patent is subject to a terminal disclaimer.

(21) Appl. No.: 17/406,270

(22) Filed: Aug. 19, 2021

(65) Prior Publication Data

US 2022/0045929 A1     Feb. 10, 2022

Related U.S. Application Data

(63) Continuation of application No. 16/235,354, filed on Dec. 28, 2018, now Pat. No. 11,121,957.

(51) Int. Cl.
*H04L 43/16* (2022.01)
*H04L 41/5006* (2022.01)
(Continued)

(52) U.S. Cl.
CPC .......... *H04L 43/16* (2013.01); *H04L 41/5006* (2013.01); *H04L 43/08* (2013.01);
(Continued)

(58) Field of Classification Search
CPC ..... H04L 43/16; H04L 43/08; H04L 43/0852; H04L 43/0888; H04L 41/5006;
(Continued)

(56) References Cited

U.S. PATENT DOCUMENTS 10,567,467 B2* 2/2020 Sreevalsan ............ H04L 65/80
11,121,957 B2  9/2021 Guim Bernat et al.
(Continued)

OTHER PUBLICATIONS

"U.S. Appl. No. 16/235,354, Non Final Office Action mailed Oct. 28, 2020", 15 pgs.
(Continued)

*Primary Examiner* — Jefferey F Harold
*Assistant Examiner* — Franklin S Andramuno
(74) *Attorney, Agent, or Firm* — Schwegman Lundberg & Woessner, P.A.

(57) ABSTRACT

A device of a service coordinating entity includes communications circuitry to communicate with a plurality of access networks via a corresponding plurality of network function virtualization (NFV) instances, processing circuitry, and a memory device. The processing circuitry is to perform operations to monitor stored performance metrics for the plurality of NFV instances. Each of the NFV instances is instantiated by a corresponding scheduler of a plurality of schedulers on a virtualization infrastructure of the service coordinating entity. A plurality of stored threshold metrics is retrieved, indicating a desired level for each of the plurality of performance metrics. A threshold condition is detected for at least one of the performance metrics for an NFV instance of the plurality of NFV instances, based on the retrieved
(Continued)

plurality of threshold metrics. A hardware resource used by the NFV instance to communicate with an access network is adjusted based on the detected threshold condition.

25 Claims, 19 Drawing Sheets

(51) Int. Cl.
    *H04L 41/5019*      (2022.01)
    *H04L 43/08*      (2022.01)
    *H04L 43/0852*      (2022.01)
    *H04L 43/0888*      (2022.01)
    *H04L 45/125*      (2022.01)
    *H04L 47/2408*      (2022.01)
    *H04L 47/2425*      (2022.01)
    *H04W 28/02*      (2009.01)

(52) U.S. Cl.
    CPC ........ *H04L 45/125* (2013.01); *H04L 47/2408* (2013.01); *H04L 47/2425* (2013.01); *H04L 41/5019* (2013.01); *H04L 43/0852* (2013.01); *H04L 43/0888* (2013.01); *H04W 28/0268* (2013.01)

(58) Field of Classification Search
    CPC ............... H04L 41/5019; H04L 45/125; H04L 47/2408; H04L 47/2425; H04W 28/0268
    See application file for complete search history.

(56) References Cited

U.S. PATENT DOCUMENTS

| | | | |
|---|---|---|---|
| 2008/0002692 A1* | 1/2008 | Meylan | H04W 72/30 370/390 |
| 2016/0352924 A1* | 12/2016 | Senarath | H04M 15/66 |
| 2018/0013656 A1* | 1/2018 | Chen | H04W 24/02 |
| 2018/0121222 A1* | 5/2018 | Sharma | G06F 9/45558 |
| 2019/0104029 A1* | 4/2019 | Guim Bernat | H04L 41/5006 |
| 2019/0140933 A1 | 5/2019 | Guim Bernat et al. | |
| 2019/0215235 A1* | 7/2019 | Chou | G06F 9/45558 |
| 2020/0336258 A1* | 10/2020 | Zhu | H04L 43/0835 |

OTHER PUBLICATIONS

"U.S. Appl. No. 16 235,354, Response filed Jan. 14, 21 to Non Final Office Action mailed Oct. 28, 2020", 13 pgs.

"U.S. Appl. No. 16/235,354, Notice of Allowance mailed May 12, 2021", 8 pgs.

Patel, Milan, "Mobile-Edge Computing Introductory Technical White Paper", Issue 1, (Sep. 2014), 36 pgs.

U.S. Appl. No. 16/235,354 U.S. Pat. No. 11,121,957, filed Dec. 28, 2018, Dynamic Quality of Service in Edge Cloud Architectures.

\* cited by examiner

DYNAMIC QUALITY OF SERVICE IN EDGE CLOUD ARCHITECTURES

This application is a continuation of U.S. patent application Ser. No. 16/235,354, filed Dec. 28, 2018, which is incorporated herein by reference in its entirety.

TECHNICAL FIELD

Embodiments described herein generally relate to multi-access edge computing (MEC) and related wireless communication systems. More specifically, aspects of the disclosure relate to dynamic quality of service (QoS) in edge cloud architectures such as MEC-based architectures.

BACKGROUND

MEC encompasses architectures that enable cloud computing functionality or information technology (IT) services at network (e.g., cellular network) edges. MEC may reduce network congestion by moving applications, data, discovery, etc. closer to the user (e.g., mobile device, user equipment (UE), station (STA), etc.). Some MEC details dealing with security (e.g., both user security as well as application integrity), radio use, etc., have been promulgated by European Telecommunications Standards Institute (ETSI), such as described in the "Mobile Edge Computing Introductory Technical White Paper," published Sep. 1, 2014. A set of specifications and white papers providing further details and implementation use cases for MEC scenarios is being developed and published on an ongoing basis by ETSI as part of the ETSI MEC industry specification group (ISG).

MEC is intended to support developing mobile use cases of edge computing, to allow application developers and content providers to access computing capabilities and an IT service environment in dynamic settings at the edge of the network. Edge computing, at a more general level, refers to the movement of compute and storage resources closer to, or into, smart endpoint devices in order to optimize total cost of ownership, reduce application latency, improve service capabilities, and improve compliance with security or data privacy requirements. Edge computing may in some scenarios provide a cloud-like distributed service, which offers orchestration and management for applications among many types of storage and compute resources. Edge computing may be further integrated with use cases and technology developed for the Internet-of-Things (IoT) and Fog networking, as endpoint devices and gateways attempt to access network resources and applications at locations moved closer to the "edge" of the network.

In these and other settings, edge computing attempts to offer reduced latency, increased responsiveness, and more available computing power than offered in traditional cloud network services and wide area network connections. Despite the rapid activity occurring with the development of standards and architectures involving these technologies, many limitations and technical problems still exist in the design and use of IoT, MEC, and next-generation edge networks.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1A:
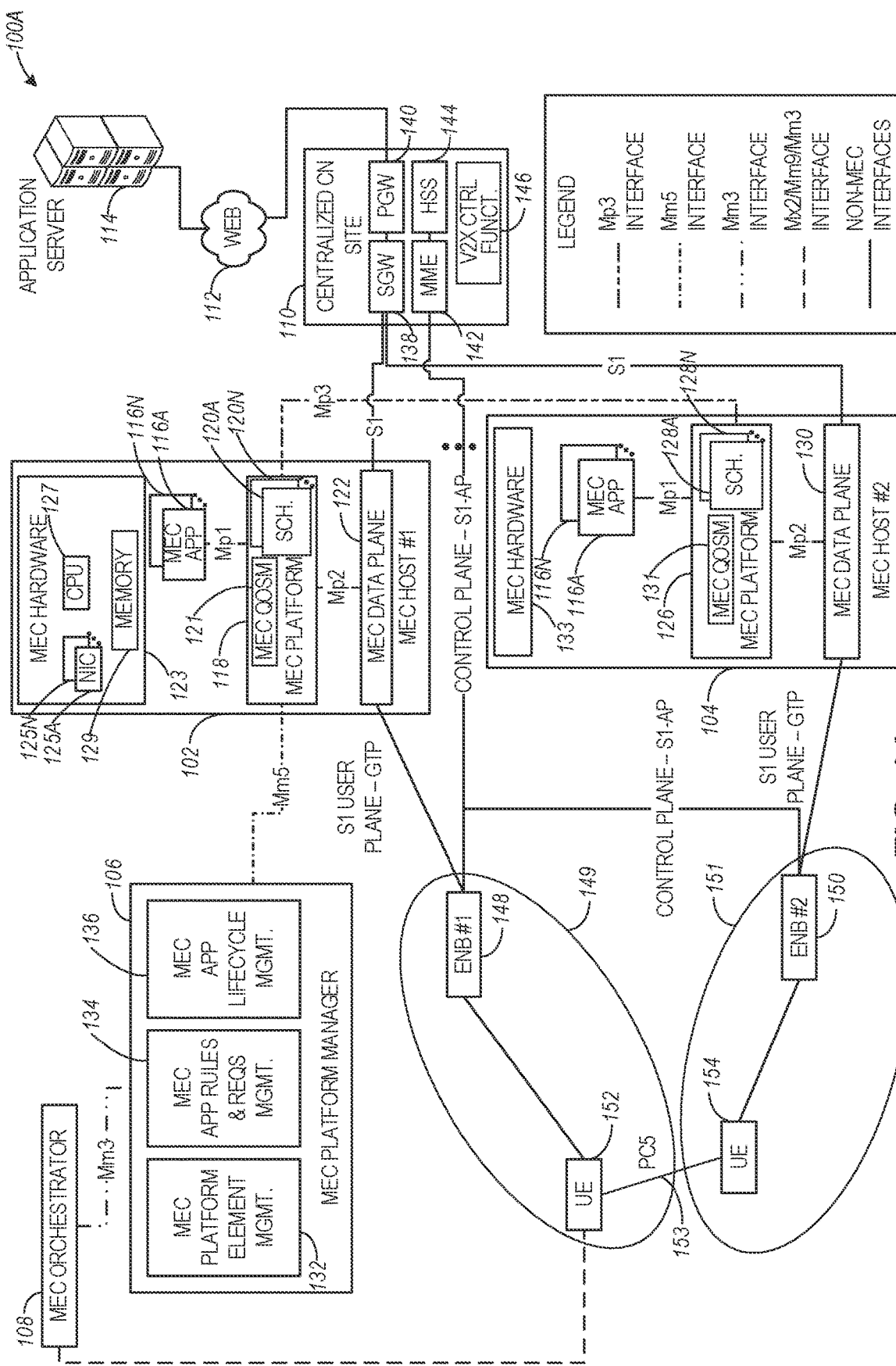
FIG. 1A illustrates a MEC communication infrastructure with a common core network and a MEC QoS manager, according to an example.

In the following description, methods, configurations, and related apparatuses are disclosed for dynamic QoS for MEC-based architectures. As an overview, the technological solutions disclosed herein integrate MEC with various types of IoT or Fog networking implementations as well as dynamic QoS management. These may benefit a variety of use cases, such as fifth generation (5G) network communications among automotive devices, including those use cases termed as vehicle-to-vehicle (V2V), vehicle-to-infrastructure (V2I), and vehicle-to-everything (V2X). As with most MEC installations, the goal with the present configurations is to bring the application endpoints as close to the vehicular environment, or other endpoints, as possible and to dynamically adjust compute resources, to enable low latency or high bandwidth services with optimal QoS, These systems and techniques may be implemented in, or augment, virtualized environments which may be implemented within various types of MEC, network function virtualization (NFV), or fully virtualized 5G network environments.

As is understood, MEC architectures offer application developers and content providers cloud-computing capabilities and an IT service environment at the edge of the network. This environment offers ultra-low latency and high bandwidth throughput as well as real-time access to radio network information that may be leveraged by applications. MEC technology permits flexible and rapid deployments of innovative applications and services towards mobile subscribers, enterprises, or vertical segments.

In aspects associated with MEC communication architectures, applicable Service Level Agreements (SLAs) and QoS compute requirements can be moved from a central office location (e.g., a data center) to one or more aggregation points (e.g., MEC hosts) near the base stations. Consequently, wired and wireless communications 2G, 3G, 4G, 5G, and other types of communications) can be performed by NFVs that are instantiated in the edge cloud facilities (e.g., MEC hosts), coexisting with other types of services handled by the MEC hosts (e.g., IoT communications including V2X communications).

In some aspects, computing resource allocation functionalities can be used by operating system or software stacks in order to guarantee capacity of a specific resource (i.e., cash, memory bandwidth, processing power, and so forth) to different applications. In this case, the software stack can be responsible for monitoring resources and setting up the corresponding class of services depending on the required performance metrics. Techniques using the software stack for monitoring resources can lack the capabilities to automatically and quickly adapt to resources bound specific schedulers based on current and predicted wireless load.

Techniques disclosed herein may be used to enhance resource allocation and platform QoS/SLA logic with a new hardware scheme employing a MEC QoS manager circuitry that is used to monitor how NFVs perform (e.g., by monitoring a set of registers where performance metrics of the NFVs are registered) and compare that performance against threshold (or target) metrics for the NFVs that are stored in another register. The MEC QoS manager can be configured to use Top-down Microarchitecture Analysis Method (TMAM) metrics and process monitoring (PMON) counters to identify a computing resource that is bottlenecking the NFVs' performance. The MEC QoS manager can incrementally reserve more amount of the bottlenecking resource until reaching back the required performance. In other aspects, if computing resources for a specific type of communication handled by an instantiated NFV are not fully utilized, the MEC QoS manager will release some of the resources reserved to the NFV.

In some aspects, the MEC QoS manager can include prediction logic (e.g., based on a dynamic neural network techniques) to perform unsupervised training of a model that uses the PMON counters, current SLA assigned resources and current NFV performance as inputs to generate a prediction on how an NFV performs under certain traffic configurations and QoS configurations. The prediction functionality is used for determining SLA parameters and resource allocations to be performed in order to avoid future performance degradation. In this regard, techniques disclosed herein in connection with the MEC QoS manager provide mechanisms to the NFVs to specify performance targets and current performance as well as allows the NFVs provider to dynamically adjust QoS and compute resources in a MEC-based communication architecture. Additional functionalities performed by the MEC QoS manager are discussed hereinbelow in connection with FIGS. 1A-13.

FIG. 1A illustrates a MEC communication infrastructure 1004 with a common core network and a MEC QoS manager, according to an example. The illustrated system is an implementation that operates within the ETSI MEC ISG framework. The connections represented by some form of a dashed line (as noted in the legend in FIG. 1A) may be defined according to a specification from an ETSI MEC standards family.

The MEC communication infrastructure 100A can include entities from a MEC-based architecture as well as entities from a third-generation partnership project (3GPP) based architecture. For example, the MEC communication infrastructure 100A can include a plurality of MEC hosts such as MEC hosts 102 and 104, a MEC platform manager 106, and a MEC orchestrator 108. The 3GPP based entities can include a centralized core network (CN) 110 coupled to an application server 114 via the network 112 (e.g., the Internet), as well as radio access networks (RANs) represented by base stations 148 and 150 coupled to corresponding user equipments (UEs) 152 and 154. The base stations 148 and 150 can include evolved Node-Bs (eNBs), Next Generation Node-Bs (gNBs), or other types of base stations operating in connection with a 3GPP wireless family of standards or another type of wireless standard.

In some aspects, the MEC communication infrastructure 100A can be implemented by different network operators in the same country and/or in different countries, using different network traffic types. For example, the radio access network associated with base station 148 (with a coverage area 149) can be within a first public land mobile network (PLMN) (i.e., associated with a first mobile services provider or operator and a first network traffic type), and base station 150 (with a coverage area 151) can be within a second public land mobile network (PLMN) (i.e., associated with a second mobile services provider or operator and a second network traffic type). As used herein, the terms "mobile services provider" and "mobile services operator" are interchangeable.

In this regard, the MEC communication infrastructure 100A can be associated with a multi-operator scenario composed by two coverage areas 149 and 151 where communication services (e.g., V2X services) can be provided, with each coverage area being operated by a mobile services operator. Techniques disclosed herein can be used to provide QoS management associated with different types of communication links across coverage areas of one or more mobile services operators, without service disruption and by ensuring end-to-end (E2E) performances.

The solid line connections in FIG. 1A represent non-MEC connections, such as utilizing 3GPP cellular network connections S1, S1-AP, etc. Other connection techniques (e.g., protocols) and connections may also be used. Accordingly, in the scenario of FIG. 1A, the system entities (e.g., MEC orchestrator 108, MEC platform manager 106, MEC hosts 102, 104 are connected by MEC (or NFV) logical links (indicated with dashed lines), in addition to network infrastructure links (e.g., a 5G Long Term Evolution (LTE) network, such as provided among UEs 152, 154, eNBs 148, 150, a CN site 110, etc.) (indicated with solid lines). A further connection to cloud services (e.g., an application server 114 access via the network 112) may also be connected via backhaul network infrastructure links.

Techniques disclosed herein apply to 2G/3G/4G/LTE/ LTE-A (LTE Advanced) and 5G networks, with the examples and aspects disclosed using 4G/LTE networks. In aspects, the CN 110 may be an evolved packet core (EPC) network, a NextGen Packet Core (NPC) network, or some other type of CN (e.g., as illustrated in reference to FIGS. 2A-3D). In EPC (Evolved Packet Core), which is associated with 4G/LTE, the CN 110 can include a serving gateway (S-GW or SGW) 138 a packet data network (PDN) gateway (P-GW or PGW) 140, a mobility management entity (MME) 142, and a home subscriber server (HSS) 144 coupled to a V2X control function 146. In 5G, the Core Network is referred to as the NextGen Packet Network (NPC). In NPC, the S/P-GW is replaced with a user plane function (UPF), and the MME is replaced with two individual functional components, the Access Management Function (AMF) and the Session Management Function (SMF). The 4G HSS is split into different entities in 5G: the Authentication Server Function (AUSF) and the Universal Data Management (UDM), with the subscription data being managed via the Universal Data Management (UDM) function. In EPC, the S1 interface can be split into two parts: the S1-U (user plane) interface which carries traffic data between the eNBs 148, 150 and the S-GW 138 via the MEC hosts 102, 104, and the S1-AP (control plane) interface which is a signaling interface between the eNBs 148, 150 and the M1N/IE 142.

The MME 142 may be similar in function to the control plane of legacy Serving General Packet Radio Service (GPRS) Support Nodes (SGSN). The MME 142 may manage mobility aspects in access such as gateway selection and tracking area list management. The HSS 144 may comprise a database for network users, including subscription-related information to support the network entities' handling of communication sessions, including subscription information associated with V2X communications. The CN 110 may comprise one or several HSSs 144, depending on the number of mobile subscribers, on the capacity of the equipment, on the organization of the network, etc. For example, the HSS 144 can provide support for routing/roaming, authentication, authorization (e.g., V2X communication authorization), naming/addressing resolution, location dependencies, etc.

The S-GW 138 may terminate the S1 interface 413 towards the RANs of eNBs 148, 150, and route data packets between the RANs and the CN 110. In addition, the S-GW 138 may be a local mobility anchor point for inter-RAN node handovers and also may provide an anchor for inter-3GPP mobility. Other responsibilities may include charging and some policy enforcement.

The P-GW 140 may terminate an SGi interface toward a PDN. The P-GW 140 may route data packets between the RANs and external networks such as a network including the application server (AS) 114 (alternatively referred to as application function (AF)) via an Internet Protocol (IP) interface (e.g., an interface to the network 112 coupled to the AS 114. The 140 can also communicate data to other external networks, which can include the Internet, IP multimedia subsystem (IPS) network, and other networks. Generally, the application server 114 may be an element offering applications that use IP bearer resources with the core network (e.g., UMTS Packet Services (PS) domain, LTE PS data services, etc.). The application server 114 can also be configured to support one or more communication services e.g., Voice-over-Internet Protocol (VoIP) sessions, PTT sessions, group communication sessions, social networking services, etc.) for the UEs 152, 154 via the CN 110 and one or more of the MEC hosts 102, 104.

The P-GW 140 may further include a node for policy enforcement and charging data collection. A Policy and Charging Enforcement Function (PCRF) (not illustrated in FIG. 1A) can be the policy and charging control element of the CN 110. In a non-roaming scenario, there may be a single PCRF in the Home Public Land Mobile Network (HPLMN) associated with a UEs Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMIN and a Visited PCRF (V-PCRF) within a Visited Public Land Mobile Network (VPLMN). The PCRF may be communicatively coupled to the application server 114 via the P-GW 140. The application server 114 may signal the PCRF to indicate a new service flow and select the appropriate Quality of Service (QoS) and charging parameters.

The V2X control function 146 is used in connection with authorizing UEs to use V2X services based on HSS information (e.g., subscription information managed by the HSS 144), assist one or more UEs in obtaining the network address of an application server (e.g., 114) or a V2X application server, as well as providing V2X configuration parameters for direct communication (i.e., device-to-device communications). The interface for direct device-to-device communication is referred to as PC5. The PC5 parameters may be provided by the V2X control function 146 to one or more UEs for purposes of configuring V2X communication between the UEs.

The MEC hosts 102, . . . , 104 can be configured in accordance with the ETSI GS MEC-003 specification. The MEC host 102 can include a MEC platform 118, which can be coupled to one or more MEC applications (apps) such as MEC apps 116A, . . . , 116N (collectively, MEC app 116) and to MEC data plane 122. The MEC host 104 can include a MEC platform 126, which can be coupled to a MEC app 116 and MEC data plane 130. The MEC platform manager 106 can include a MEC platform element management module 132, MEC application rules and requirements management module 134, and MEC application lifecycle management module 136. The MEC host 102 also includes MEC hardware 123, such as network interfaces (e.g. network interface cards or NICs) 125A, . . . , 125N, one or more CPUs 127, and memory 129. Additional description of the MEC related entities 102, 104, 106, and 108 are provided hereinbelow in connection with FIG. 4.

In some aspects, the MEC apps 116A, . . . , 116N can each provide an NFV instance configured to process network connections associated with a specific network traffic type (e.g., 2G, 3G, 4G, 5G or another network traffic type). In this regard, the terms "MEC app" and "NFV" (or "MEC NFV") are used interchangeably. Additionally, the term "NFV" and "NFV instance" are used interchangeably. The MEC platform 118 can further include a MEC QoS manager 121 and one or more schedulers 120A, . . . , 120N (collectively, a scheduler 120). Each of the schedulers 120A, . . . , 120N may comprise suitable circuitry, logic, interfaces, and/or code and is configured to manage instantiation of NFVs 116A, . . . , 116N (collectively, an NFV 116). More specifically, a scheduler 120 can select a CPU (e.g., one of the CPUs 127) and/or other network resources for executing/ instantiating the NFV 116. Additionally, since each of the NFVs 116A, . . . , 116N is associated with processing a different network traffic type, the scheduler 120 can further select a NIC (e.g., from the available NICs 125A, . . . , 125N) for use by the NFV 116. Each of the schedulers 120A, . . . , 120N can have a different type of SLA and QoS requirements, based on the network traffic type handled by the associated NFV. For example, each traffic type (e.g., 2G, 3G, 4G, 5G, or any other type of wireless connection to the MEC host) has an associated class of service (CloS) (e.g., 2G_low, 2G_mid, 2G_high, etc.) which can be preconfigured in the MEC host (e.g., via the MEC QoS manager 121), defining CloS-specific resource requirements (i.e., I/O, memory, processing power, etc.) for different loads of that particular traffic type.

The MEC QoS manager 121 may comprise suitable circuitry, logic, interfaces, and/or code and can be configured to perform at least the following functionalities: (1) associating CloS to schedulers based on the type of wireless traffic they process, where the CloS is defined based on one or more wireless protocols (e.g., 2G/3G/4G/5G/IoT_X, etc.); (2) monitoring and predicting the amount of load that a particular scheduler will receive; (3) monitoring the performance of a particular scheduler is achieving (e.g., by using inter-process communication (IPC) metrics or metrics exposed to and computed by the MEC host such as response latency or packets per cycle); (4) identifying if any resource is limiting or will limit the performance of the schedulers or the NFVs (e.g., using TMAM metrics) when the performance is not achieved and select the optimal CloS for a particular wireless connection handled by an NFV; (5) automatically reconfigure the amount of limiting resources associated to a scheduler or NFV using an interface to computing resources within the MEC host (e.g., a Resource Director Technology (RDT) interface); (6) if the load that a particular scheduler is receiving is lower than load parameters specified during scheduler configuration and the requested load is satisfied, the MEC QoS manager can dynamically adjust computing resources. Additional details of the MEC QoS manager 121 are discussed in connection with FIG. 5.

FIG. 1A further illustrates MEC host 104 including MEC hardware 133, MEC QoS manager 131, and schedulers 128A, . . . , 128N, which can have the same functionality as MEC hardware 123, MEC QoS manager 121, and schedulers 120A, . . . , 120N described in connection with MEC host 102. Even though MEC QoS manager 121 is illustrated as being implemented within the MEC platform 118, the present disclosure is not limited in this regard and one or more components of the MEC QoS manager 121 can be implemented within other modules of the MEC host 102, the MEC orchestrator 108, or the MEC platform manager 106.

Figure 1B:
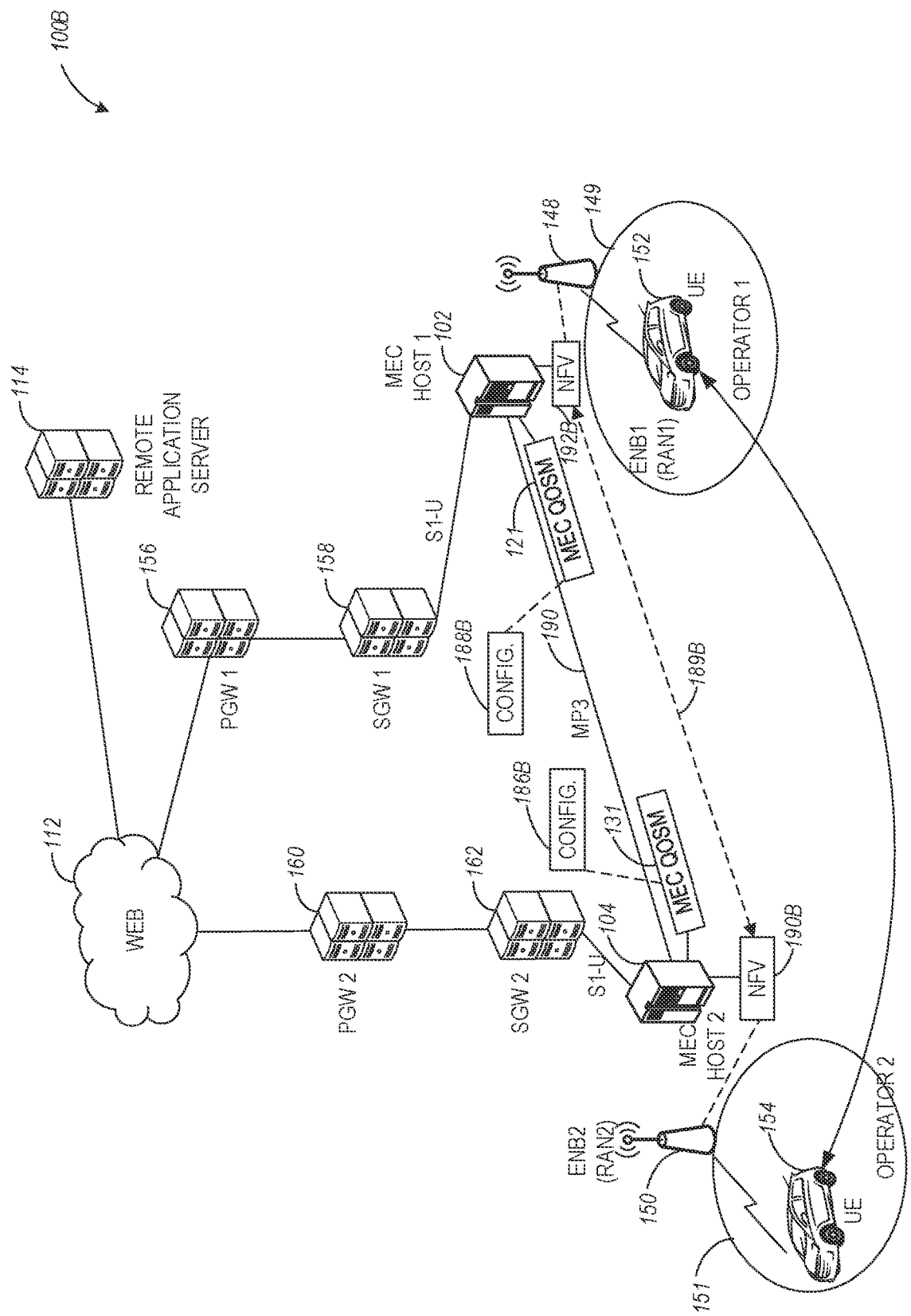
FIG. 1B illustrates a MEC communication infrastructure with separate core networks and separate MEC hosts with MEC QoS managers coupled to corresponding radio access networks, according to an example.
Figure 1C:
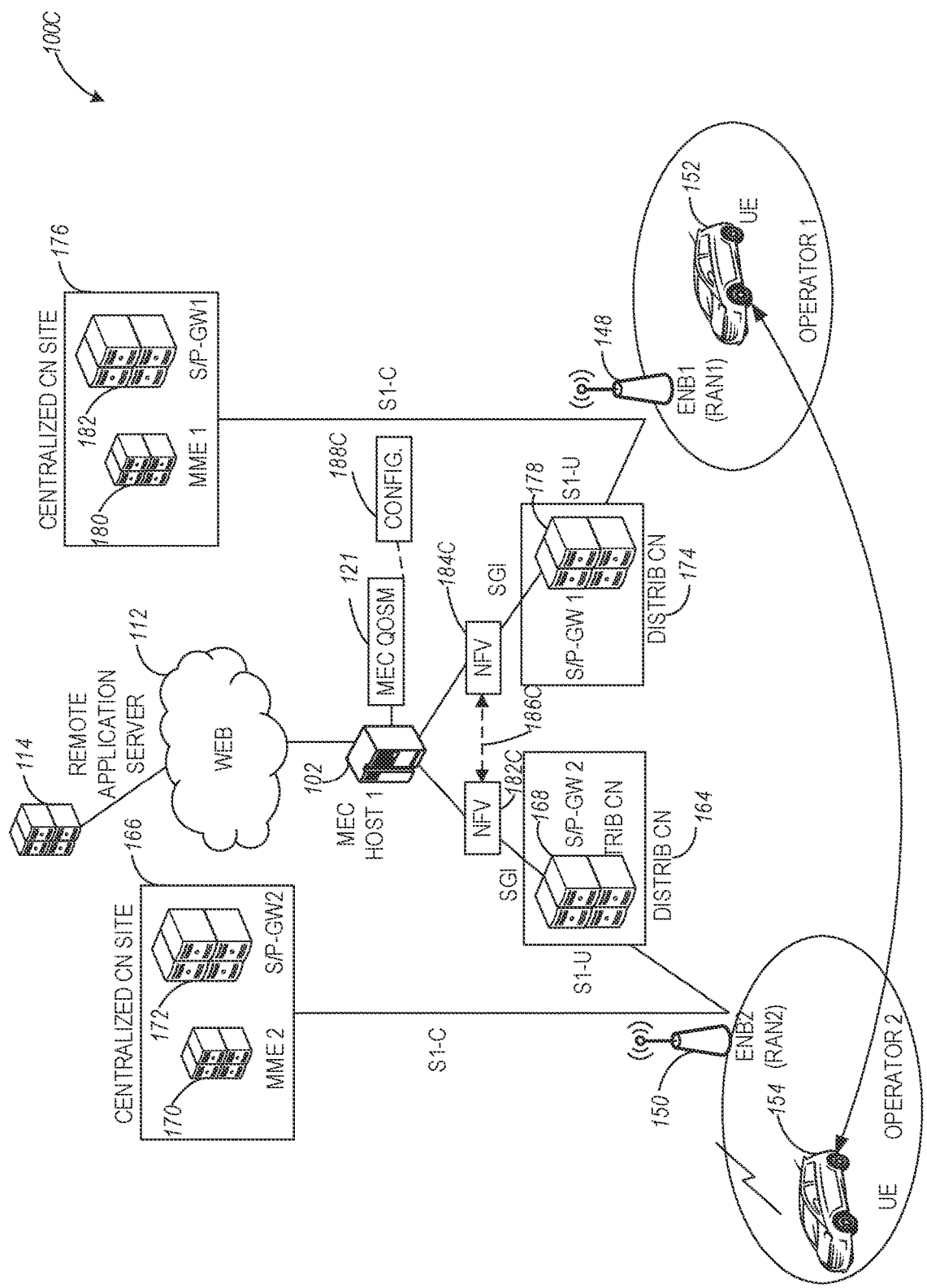
FIG. 1C illustrates a MEC communication infrastructure with a MEC host using a MEC QoS manager and coupled to separate distributed core networks, according to an example.

FIG. 1B and FIG. 1C illustrate MEC communication infrastructures that can implement the above-described features as well as techniques disclosed herein for QoS management.

FIG. 1B illustrates a MEC communication infrastructure 100B with separate core networks and separate MEC hosts with MEC QoS managers coupled to corresponding radio access networks, according to an example. Referring to FIG. 1B, the MEC communication infrastructure 100B is similar to the MEC communication infrastructure 100A of FIG. 1A, except that each of the MEC hosts 102 and 104 in infrastructure 100B is coupled to a separate core network. More specifically, MEC host 102 is coupled to a first core network that includes SGW 158 and 156. MEC host 104 is coupled to a second core network that includes SGW 162 and PGW 160. Both core networks can be coupled to the remote application server 114 via the network 112. Additionally, both core networks can be associated with different wireless protocols so that network traffic communications to and from the MEC hosts can be of different communication type.

As illustrated in FIG. 1B, MEC hosts 102 and 104 can be coupled to each other via a MEC-based interface 190, which can include an MP3 interface or another type of interface. Additionally, the MEC hosts can be located on the S1 interfaces of the core networks, downstream between the core network and the corresponding RANs of eNBs 148 and 150. In some aspects and as illustrated in FIG. 1B, UEs 152 and 154 can be located within vehicles or other mobile devices.

As illustrated in FIG. 1B, NFV 190B is instantiated within MEC host 104 and is configured to process communications with eNB 150, and NFV 192B is instantiated within MEC host 102 and is configured to process communications with eNB 148. Communications between NFVs 190B and 192B and the corresponding eNBs can be based on different wireless protocols. Additionally, NFVs 190B and 192B can be coupled via a communication path 189B, which can be part of the MEC-based interface 190 between the MEC hosts 102 and 104. In some aspects, MEC host 102 can use MEC QoS manager 121 to generate QoS configuration 188B to dynamically configure QoS including computing resource usage by NFV 192B for communicating with the eNB 148, the NFV 190B, or SGW 158. Similarly, MEC host 104 can use MEC QoS manager 131 to generate QoS configuration 186B to dynamically configure QoS including computing resource usage by NFV 190B for communicating with the eNB 150, the NFV 192B, or SGW 162.

FIG. 1C illustrates a MEC communication infrastructure 100C with a MEC host using a MEC QoS manager and coupled to separate distributed core networks, according to an example. In some aspects, MEC host 102 can instantiate NFVs 182C and 184C, with each NFV used for communication with different radio access networks. As illustrated in FIG. 1C, MEC host 102 in infrastructure 100C is coupled to corresponding SGi interfaces with each interface associated with separate distributed core networks. More specifically, MEC host 102 is coupled to a first distributed core network 174 that includes SGW/PGW 178, and to a second distributed core network 164 that includes SGW/PGW 168. Both distributed core networks can be coupled to the remote application server 114 via SGi interfaces with the MEC host 102 and the network 112. Additionally, the RANs associated with eNBs 148, 150 can be coupled to corresponding centralized core networks 176 and 166. Centralized CN 166 can include MME 170 and SGW/PGW 172, while centralized CN 176 can include MME 180 and SGW/PGW 182. In some aspects and as illustrated in FIG. 1C, UEs 152 and 154 can be located within vehicles or other mobile devices.

In some aspects and as illustrated in FIG. 1C, NFVs 182C, and 184C are instantiated within MEC host 102 and are configured to process communications with distributed CNs 164 and 174, respectively. Communications between NFVs 182C and 184C and the corresponding distributed CNs can be based on different wireless protocols. Additionally, NFVs 182C and 184C can be coupled via a communication path 186C. In some aspects, MEC host 102 can use MEC QoS manager 121 to generate QoS configuration 188C to dynamically configure QoS including computing resource usage by NFVs 182C and 184C for communicating with the distributed CNs 164/174 or the remote application server 114 via the network 112.

Figure 2A:
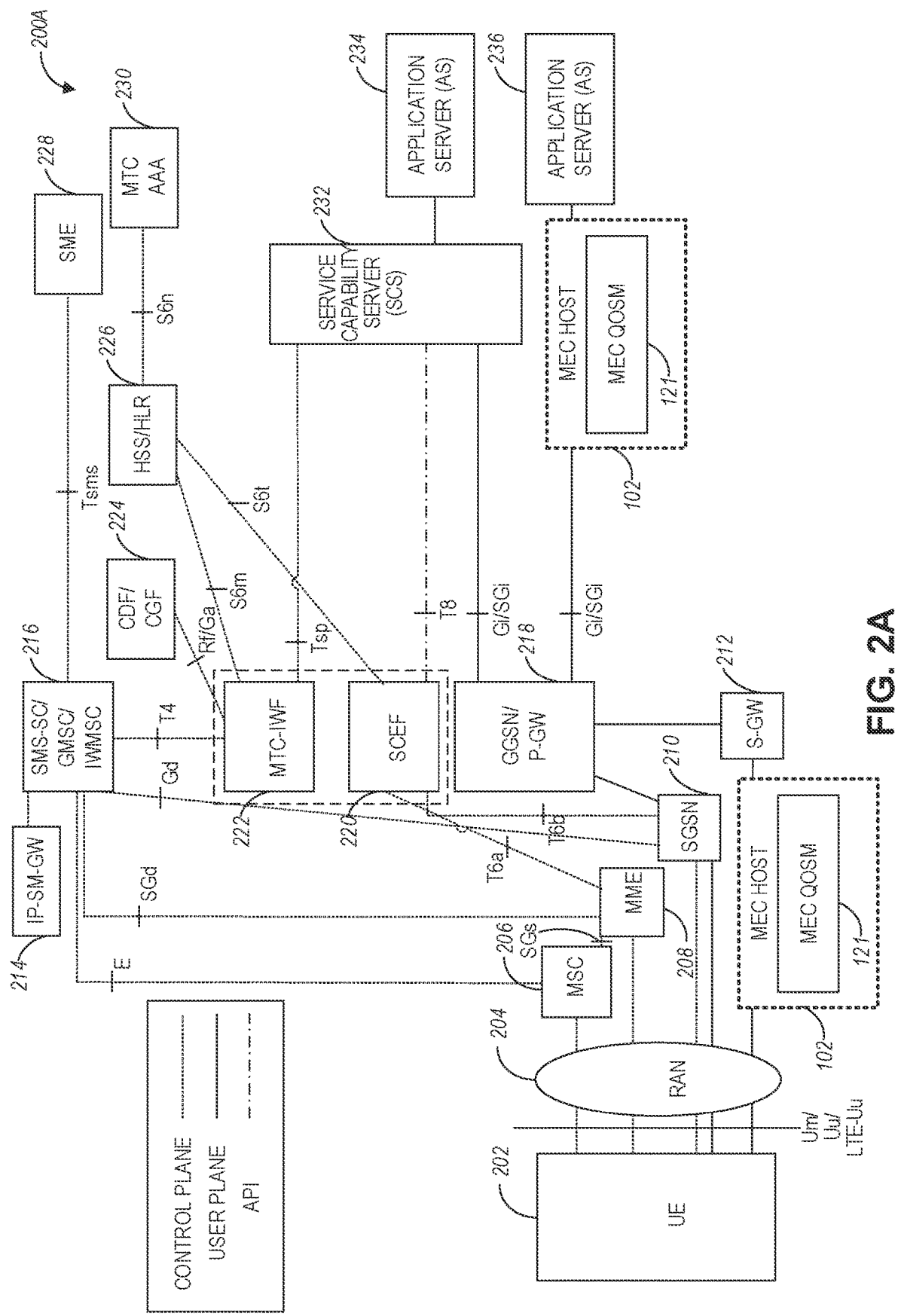
FIG. 2A illustrates an example Cellular Internet-of-Things (CIoT) network architecture with a MEC host using a MEC QoS manager, according to an example.

FIG. 2A illustrates an example Cellular Internet-of-Things (CIoT) network architecture with a MEC host using a MEC QoS manager, according to an example. Referring to FIG. 2A, the CIoT architecture 200A can include the UE 202 and the RAN 204 coupled to a plurality of core network entities. In some aspects, the UE 202 can be a machine-type communication (MTC) UE. The MT network architecture 200A can further include a mobile services switching center (MSC) 206, MME 208, a serving GPRS support node (SGSN) 210, a S-GW 212, an IP-Short-Message-Gateway (IP-SM-GW) 214, a Short Message Service-Service Center (SMS-SC)/gateway mobile service center (GMSC)/Interworking MSC (IWMSC) 216, MTC interworking function (MTC-IWF) 222, a Service Capability Exposure Function (SCEF) 220, a gateway GPRS support node (GGSN)/Packet-GW (P-GW) 218, a charging data function (CDF)/charging gateway function (CGF) 224, a home subscriber server (HSS)/a home location register (HLR) 226, short message entities (SME) 228, MTC authorization, authentication, and accounting (MTC AAA) server 230, a service capability server (SCS) 232, and application servers (AS) 234 and 236. In some aspects, the SCEF 220 can be configured to securely expose services and capabilities provided by various 3GPP network interfaces. The SCEF 220 can also provide means for the discovery of the exposed services and capabilities, as well as access to network capabilities through various network application programming interfaces (e.g., API interfaces to the SCS 232).

FIG. 2A further illustrates various reference points between different servers, functions, or communication nodes of the CIoT network architecture 200A. Some example reference points related to MTC-IWF 222 and SCEF 220 include the following: Tsms (a reference point used by an entity outside the 3GPP network to communicate with UEs used for MTC via SMS), Tsp (a reference point used by a SCS to communicate with the MTC-IWF related control plane signaling), T4 (a reference point used between MTC-IWF 222 and the SMS-SC 216 in the HPLMN), T6a (a reference point used between SCEF 220 and serving MME 208), T6b (a reference point used between SCEF 220 and serving SGSN 210), T8 (a reference point used between the SCEF 220 and the SCS/AS 234, 236), S6m (a reference point used by MTC-IWF 222 to interrogate HSS/HLR 226), S6n (a reference point used by MTC-AAA server 230 to interrogate HSS/HLR 226), and S6t (a reference point used between SCEF 220 and FISS/HLR 226).

In some aspects, the UE 202 can be configured to communicate with one or more entities within the CIoT architecture 200A via the RAN 204 (e.g., CIoT RAN) according to a Non-Access Stratum (NAS) protocol, and using one or more radio access configuration, such as a narrowband air interface, for example, based on one or more communication technologies, such as Orthogonal Frequency-Division Multiplexing (OFDM) technology. As used herein, the term "CIoT UE" refers to a UE capable of CIoT optimizations, as part of a CIoT communications architecture. In some aspects, the NAS protocol can support a set of NAS messages for communication between the UE 202 and an Evolved Packet System (EPS) Mobile Management Entity (MME) 208 and SGSN 210. In some aspects, the CIoT network architecture 200A can include a packet data network, an operator network, or a cloud service network, having, for example, among other things, servers such as the Service Capability Server (SCS) 232, the AS 234, or one or more other external servers or network components.

The RAN 204 can be coupled to the HSS/HLR, servers 226 and the AAA servers 230 using one or more reference points including, for example, an air interface based on an S6a reference point, and configured to authenticate/authorize CIoT UE 202 to access the CIoT network. The RAN 204 can be coupled to the CIoT network architecture 200A using one or more other reference points including, for example, an air interface corresponding to an SGi/Gi interface for 3GPP accesses. The RAN 204 can be coupled to the SCEF 220 using, for example, an air interface based on a T6a/T6b reference point, for service capability exposure. In some aspects, the SCEF 220 may act as an API GW towards a third-party application server such as server 234. The SCEF 220 can be coupled to the HSS/HLR 226 and MTC AAA 230 servers using an S6t reference point and can further expose an Application Programming Interface to network capabilities.

In certain examples, one or more of the MT devices disclosed herein, such as the UE 202, the RAN 204, etc., can include one or more other non-CIoT devices, or non-CIoT devices acting as CIoT devices, or having functions of a CIoT device. For example, the UE 202 can include a smartphone, a tablet computer, or one or more other electronic device acting as a CIoT device for a specific function, while having other additional functionality. In some aspects, the RAN 204 can include a CIoT enhanced Node B (CIoT eNB) communicatively coupled to a CIoT Access Network Gateway (CIoT GW). In certain examples, the RAN 204 can include multiple base stations (e.g., CIoT eNBs or other types of base stations) connected to the CIoT GW, which can include MSC 206, MME 208, SGSN 210, or S-GW 212. In certain examples, the internal architecture of RAN 204 and the CIoT GW may be left to the implementation and need not be standardized.

In some aspects, the CIoT architecture 200A can include one or more MEC hosts that can provide a communication link between different components of the CIoT architecture. For example, MEC host 102 can be coupled between the RAN 204 and the S-GW 212. In this case, the MEC host 102 can use one or more NFV instances to process wireless connections with the RAN 204 and the S-GW 212. The MEC host 102 can also be coupled between the P-GW 218 and the application server 236. In this case, the MEC host 102 can use the one or more NFV instances to process wireless connections originating from or terminating at the P-GW 218 and the application server 236. In some aspects, the MEC host 102 includes a MEC QoS manager 121, which is configured according to techniques disclosed herein to manage QoS including optimization of computing resources used for the wireless connections processed by the one or more NFV instances.

Figure 2B:
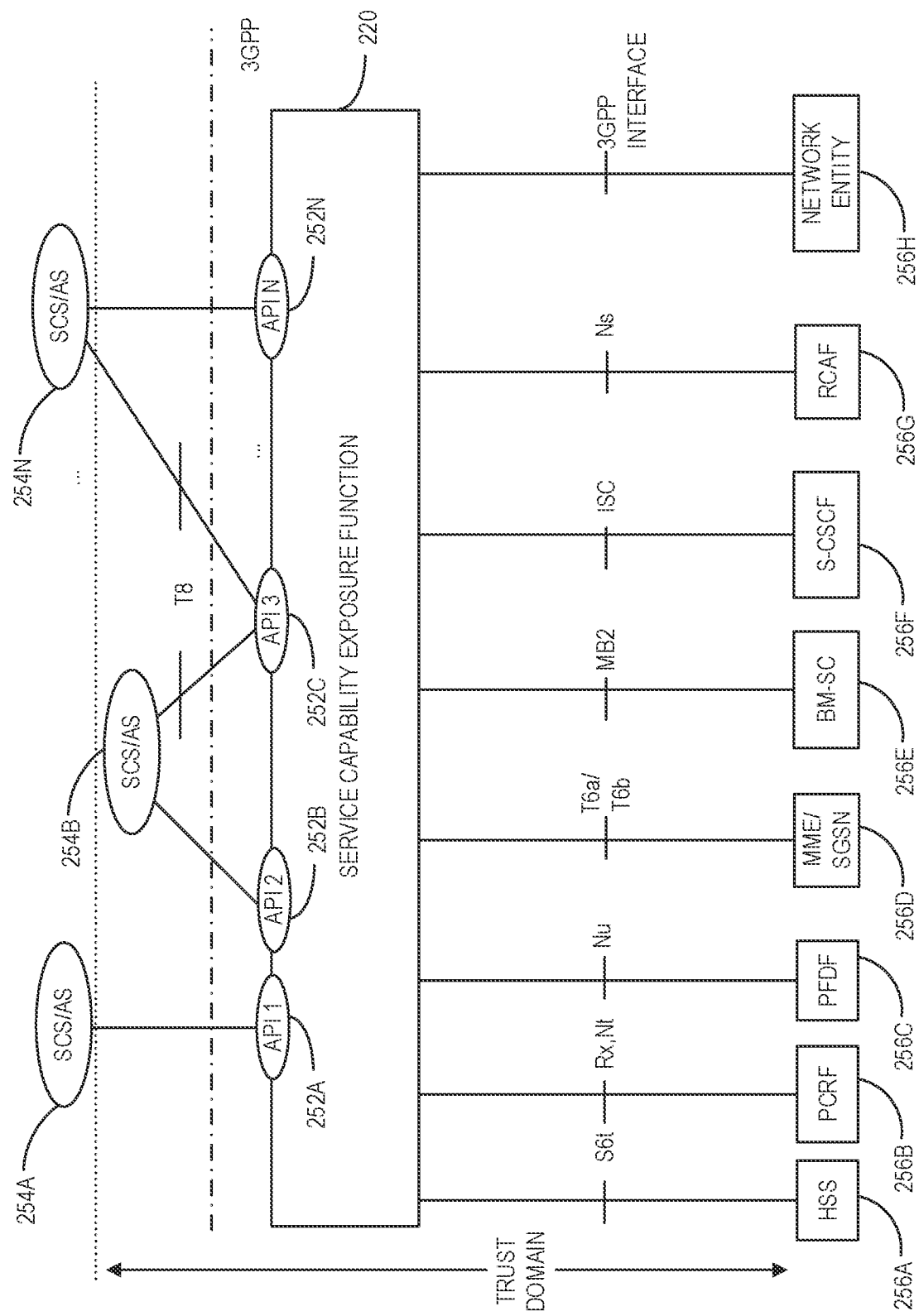
FIG. 2B illustrates an example Service Capability Exposure Function (SCEF) used by the CIoT network architecture of FIG. 2B, according to an example.

FIG. 2B illustrates an example Service Capability Exposure Function (SCEF) used by the CIoT network architecture of FIG. 2B, according to an example. Referring to FIG. 2B, the SCEF 220 can be configured to expose services and capabilities provided by 3GPP network interfaces to external third-party service provider servers hosting various applications. In some aspects, a 3GPP network such as the CIoT architecture 200A, can expose the following services and capabilities: a home subscriber server (HSS) 256A, a policy and charging rules function (PCRF) 256B, a packet flow description function (PFDF) 256C, a MME/SGSN 256D, a broadcast multicast service center (BM-SC) 256E, a serving call server control function (S-CSCF) 256F, a RAN congestion awareness function (RCAF) 256G, and one or more other network entities 256H. The above-mentioned services and capabilities of a 3GPP network can communicate with the SCEF 220 via one or more interfaces as illustrated in FIG. 2B. The SCEF 220 can be configured to expose the 3GPP network services and capabilities to one or more applications running on one or more service capability server (SCS)/application server (AS), such as SCS/AS 254A, 254B, . . . , 254N. Each of the SCS/AS 254A-254N can communicate with the SCEF 220 via application programming interfaces (APIs) 252A, 252B, 252C, . . . , 252N, as seen in FIG. 2B.

Figure 3A:
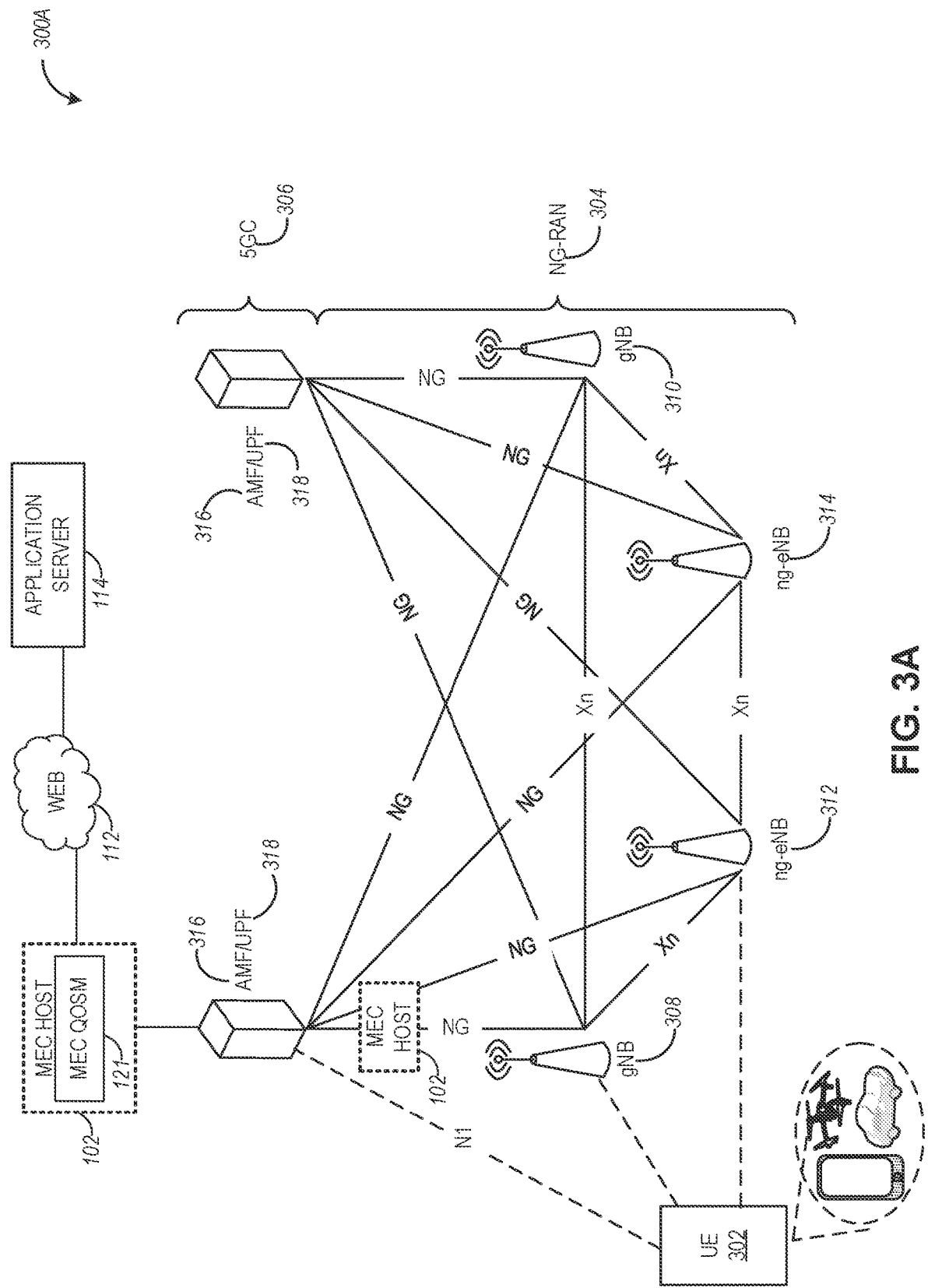
FIG. 3A is a simplified diagram of an exemplary Next-Generation (NG) system architecture with a MEC host using a MEC QoS manager, according to an example.

FIG. 3A is a simplified diagram of an exemplary Next-Generation (NG) system architecture with a MEC host using a MEC QoS manager, according to an example. Referring to FIG. 3A, the NG system architecture 300A includes NG-RAN 304 and a 5G network core (5GC) 306. The NG-RAN 304 can include a plurality of NG-RAN nodes, for example, gNBs 308 and 310, and NG-eNBs 312 and 314. The gNBs 308/310 and the NG-eNBs 312/314 can be communicatively coupled to the UE 302 via a wireless connection. The core network 306 (e.g., a 5G core network or 5GC) can include an access and mobility management function (AMF) 316 or a user plane function (UPF) 318. The AMF 316 and the UPF 318 can be communicatively coupled to the gNBs 308/310 and the NG-eNBs 312/314 via NG interfaces. More specifically, in some aspects, the gNBs 308/310 and the NG-eNBs 312/314 can be connected to the AMF 316 by N2 interface, and to the UPF 318 by N3 interface. The gNBs 308/310 and the NG-eNBs 312/314 can be coupled to each other via Xn interfaces.

In some aspects, a gNB 308 can include a node providing New Radio (NR) user plane and control plane protocol termination towards the LE and can be connected via the NG interface to the 5GC 306. In some aspects, an NG-eNB 312/314 can include a node providing evolved universal terrestrial radio access (E-UTRA) user plane and control plane protocol terminations towards the UE and is connected via the NG interface to the 5GC 306. In some aspects, any of the gNBs 308/310 and the NG-eNBs 312/314 can be implemented as a base station (BS), a mobile edge server, a small cell, a home eNB, although aspects are not so limited.

In some aspects, the NG system architecture 300A can include one or more MEC hosts that can provide a communication link between different components of the NG architecture. For example, MEC host 102 can provide an interface between the AMF 316 (or UPF 318) in the 5GC 306 and the application server 114. The MEC host 102 can use one or more NFV instances to process wireless connections with the 5GC 306 and the application server 114. The MEC host 102 can also be coupled between one or more of the gNBs (e.g., gNB 308) and the AMF/UPF in the 5GC 306. In this case, the MEC host 102 can use the one or more NF V instances to process wireless connections originating from or terminating at the gNB 308 and the 5GC 306. In some aspects, the MEC host 102 includes an MEC QoS manager 121, which is configured according to techniques disclosed herein to manage QoS including optimization of computing resources used for the wireless connections processed by the one or more NFV instances when communicating with the NG-RAN 304, the 5GC 306, or the application server 114.

Figure 3B:
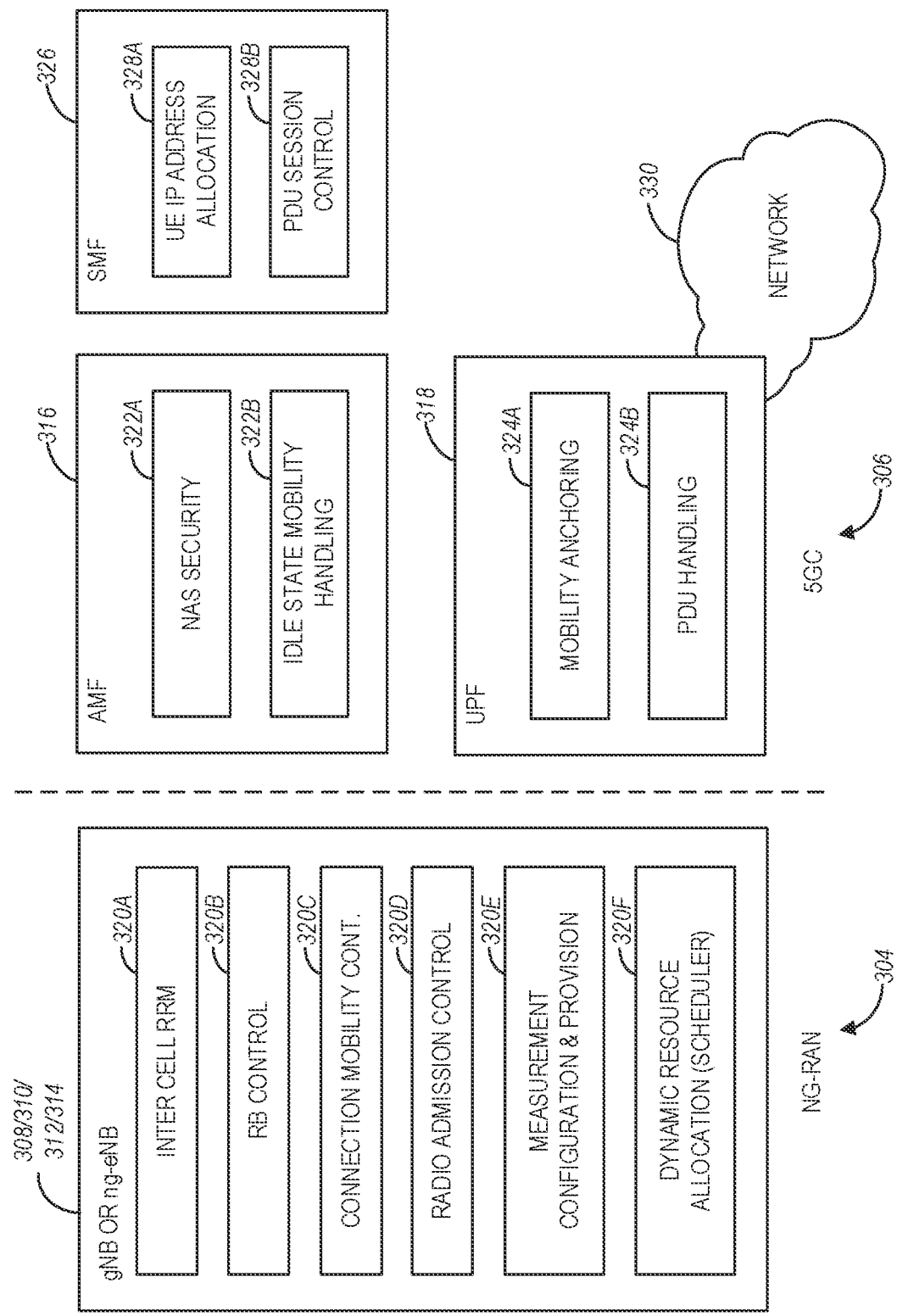
FIG. 3B illustrates an exemplary functional split between next generation radio access network (NG-RAN) and the 5G Core network (5GC) in connection with the NG system architecture of FIG. 3A, according to an example.

FIG. 3B illustrates an exemplary functional split between next generation radio access network (NG-RAN) and the 5G Core network (5GC) in connection with the NG system architecture of FIG. 3A, according to an example. FIG. 3B illustrates some of the functionalities the gNBs 308/310 and the NG-eNBs 312/314 can perform within the NG-RAN 304, as well as the AMF 316, the UPF 318, and a Session Management Function (SMF) 326 (not illustrated in FIG. 3A) within the 5GC 306. In some aspects, the 5GC 306 can provide access to a network 330 (e.g., the Internet) to one or more devices via the NG-RAN 304.

In some aspects, the gNBs 308/310 and the NG-eNBs 312/314 can be configured to host the following functions: functions for Radio Resource Management (e.g., inter-cell radio resource management 320A, radio bearer control 320B, connection mobility control 320C, radio admission control 320D, measurement and measurement reporting configuration for mobility and scheduling 320E, and dynamic allocation of resources to UEs in both uplink and downlink (scheduling) 320F); IP header compression; encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some aspects, the AMF 316 can be configured to host the following functions, for example: NAS signaling termination; NAS signaling security 322A; access stratum (AS) security control; inter-core network (CN) node signaling for mobility between 3GPP access networks; idle state/mode mobility handling 322B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; or SMF selection, among other functions.

The UPF 318 can be configured to host the following functions, for example: mobility anchoring 324A (e.g., anchor point for Intra-/Inter-RAT mobility); packet data unit (PDU) handling 324B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); or downlink packet buffering and downlink data notification triggering, among other functions.

The Session Management function (SMF) 326 can be configured to host the following functions, for example: session management; UE IP address allocation and management 328A; selection and control of user plane function (UPF); PDU session control 328B, including configuring traffic steering at UPF 318 to route traffic to proper destination; control part of policy enforcement and QoS; or downlink data notification, among other functions.

Figure 3C:
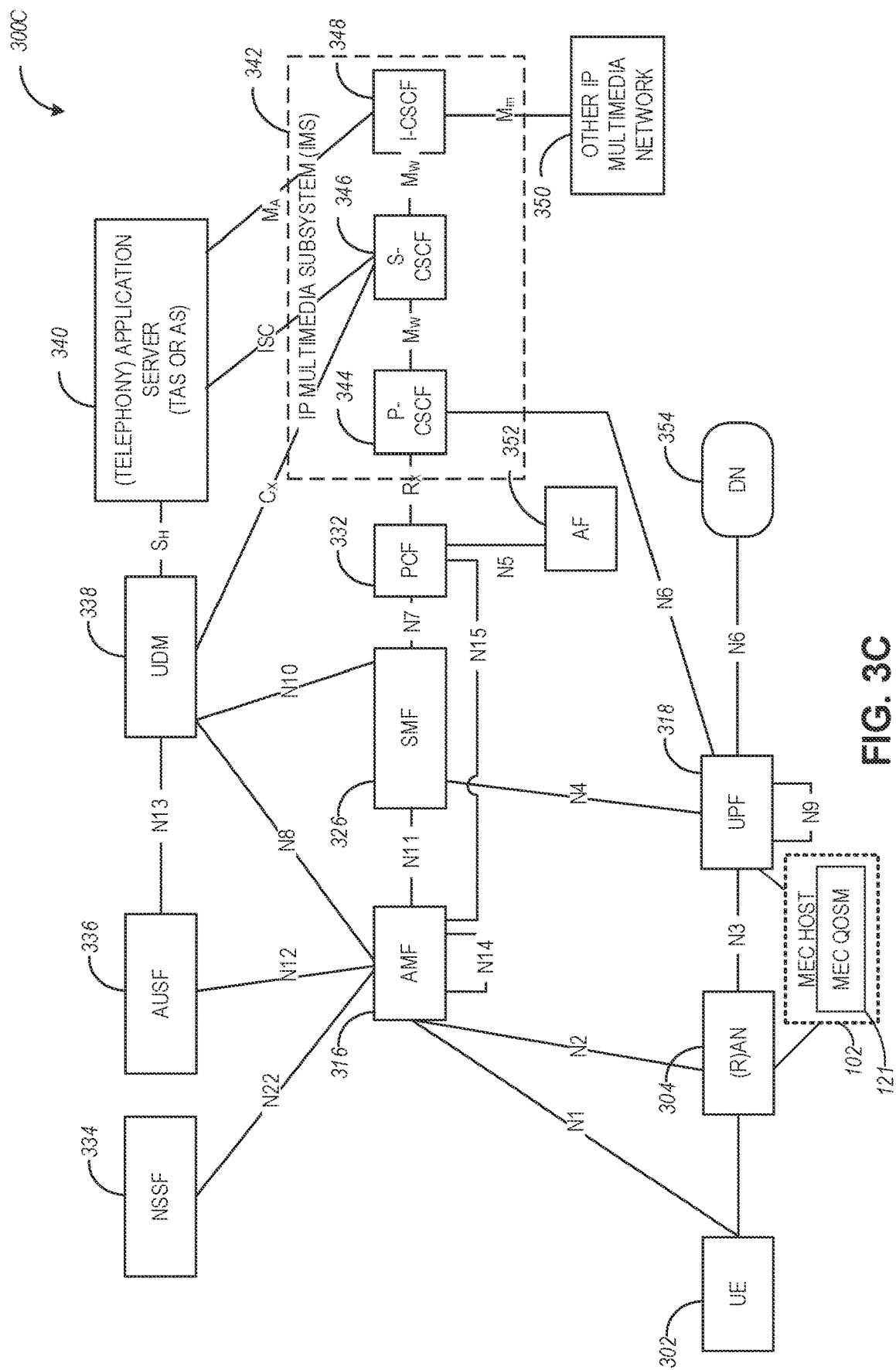
FIG. 3C and FIG. 3D illustrate exemplary non-roaming 5G system architectures with a MEC host using a MEC QoS manager, according to an example.
Figure 3D:
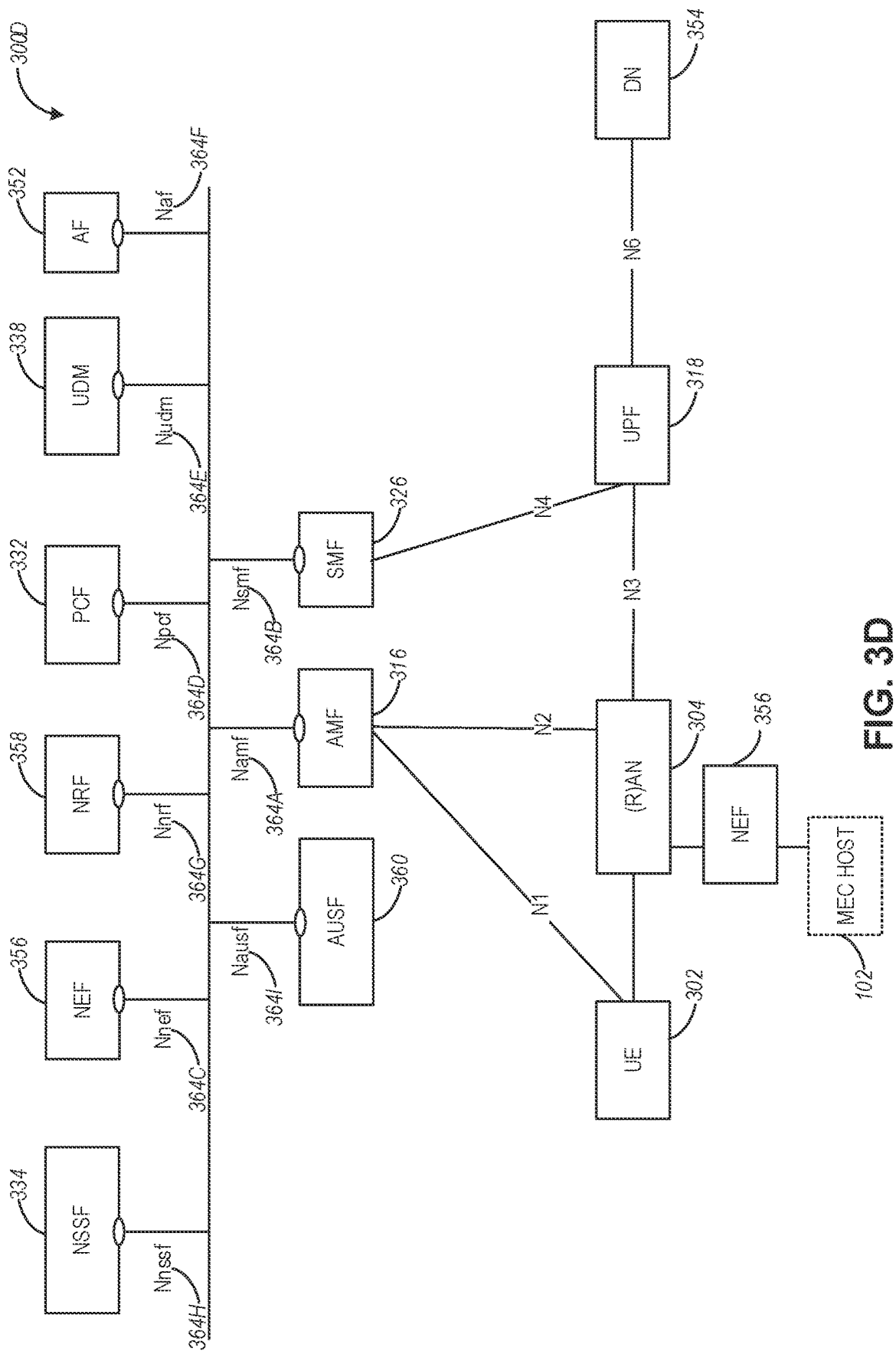

FIG. 3C and FIG. 3D illustrate exemplary non-roaming 5G system architectures with a MEC host using a MEC QoS manager, according to an example. Referring to FIG. 3C, an exemplary 5G system architecture 300C is illustrated in a reference point representation. More specifically, UE 302 can be in communication with RAN 304 as well as one or more other 5G core (5GC) network entities. The 5G system architecture 300C includes a plurality of network functions (NFs), such as access and mobility management function (AMF) 316, session management function (SMF) 326, policy control function (PCF) 332, application function (AF) 352, user plane function (UPF) 318, network slice selection function (NSSF) 334, authentication server function (AUSF) 336, and unified data management (UDM) 338.

The UPF 318 can provide a connection to a data network (DN) 354, which can include, for example, operator services, Internet access, or third-party services. The AMF 316 can be used to manage access control and mobility and can also include network slice selection functionality. The SMF 326 can be configured to set up and manage various sessions according to a network policy. The UPF 318 can be deployed in one or more configurations according to the desired service type. The PCF 332 can be configured to provide a policy framework using network slicing, mobility management, and roaming (similar to PCRF in a 4G communication system). The UDM 338 can be configured to store subscriber profiles and data (similar to an HSS in a 4G communication system), such as V2X subscription information or another type of subscription information for services available within the architecture 300C.

In some aspects, the 5G system architecture 300C includes an IP multimedia subsystem (IMS) 342 as well as a plurality of IP multimedia core network subsystem entities, such as call session control functions (CSCFs). More specifically, the IMS 342 includes a CSCF, which can act as a proxy CSCF (P-CSCF) 344, a serving CSCF (S-CSCF) 346, an emergency CSCF (E-CSCF) (not illustrated in FIG. 3C), or interrogating CSCF (I-CSCF) 348. The P-CSCF 344 can be configured to be the first contact point for the UE 302 within the IMS 342. The S-CSCF 346 can be configured to handle the session states in the network, and the E-CSCF can be configured to handle certain aspects of emergency sessions such as routing an emergency request to the correct emergency center or public safety answering point (PSAP). The I-CSCF 348 can be configured to function as the contact point within an operator's network for all IMS connections destined to a subscriber of that network operator, or a roaming subscriber currently located within that network operator's service area. In some aspects, the I-CSCF 348 can be connected to another IP multimedia network 350, e.g. an IMS operated by a different network operator.

In some aspects, the UDM 338 can be coupled to an application server 340, which can include a telephony application server (TAS) or another application server (AS) including a MEC host. The AS 340 can be coupled to the IMS 342 via the S-CSCF 346 or the I-CSCF 348. In some aspects, the 5G system architecture 300C can use one or more MEC hosts to provide an interface and offload processing of wireless communication traffic. For example and as illustrated in FIG. 3C, the MEC host 102 can provide a connection between the RAN 304 and UPF 318 in the core network. The MEC host 102 can use one or more NFV instances instantiated on virtualization infrastructure within the host to process wireless connections to and from the RAN 304 and the UPF 318. Additionally, the MEC host 102 can use the MEC QoS manager 121 and techniques disclosed herein to manage QoS, including the use of computing resources by the NFV instances.

FIG. 3D illustrates an exemplary 5G system architecture 300D in a service-based representation. System architecture 300D can be substantially similar to (or the same as) system architecture 300C. In addition to the network entities illustrated in FIG. 3C, system architecture 300D can also include a network exposure function (NEF) 356 and a network repository function (NRF) 358. In some aspects, 5G system architectures can be service-based and interaction between network functions can be represented by corresponding point-to-point reference points Ni (as illustrated in FIG. 3C) or as service-based interfaces (as illustrated in FIG. 3D).

A reference point representation shows that an interaction can exist between corresponding NF services. For example, FIG. 3C illustrates the following reference points: N1 (between the UE 302 and the AMF 316), N2 (between the RAN 304 and the AMF 316), N3 (between the RAN 304 and the UPF 318), N4 (between the SMF 326 and the UPF 318), N5 (between the PCF 332 and the AF 352), N6 (between the UPF 318 and the DN 354), N7 (between the SMF 326 and the PCF 332), N8 (between the UDM 338 and the AMF 316), N9 (between two UPFs 318), N10 (between the UDM 338 and the SMF 326), N11 (between the AMF 316 and the SMF 326), N12 (between the AUSF 336 and the AMF 316), N13 (between the AUSF 336 and the UDM 338), N14 (between two AMFs 316), N15 (between the PCF 332 and the AMF 316 in case of a non-roaming scenario, or between the PCF 332 and a visited network and AMF 316 in case of a roaming scenario), N16 (between two SMFs; not shown), and N22 (between AMF 316 and NSSF 334). Other reference point representations not shown in FIG. 3C can also be used.

In some aspects, as illustrated in FIG. 3D, service-based representations can be used to represent network functions within the control plane that enable other authorized network functions to access their services. In this regard, 5G system architecture 300D can include the following service-based interfaces: Namf 364A (a service-based interface exhibited by the AMF 316), Nsmf 364B (a service-based interface exhibited by the SMF 326), Nnef 364C (a service-based interface exhibited by the NEF 356), Npcf 364D (a service-based interface exhibited by the PCF 332), Nudm 364E (a service-based interface exhibited by the UDM 338), Naf 364F (a service-based interface exhibited by the AF 352), Nnrf 364G (a service-based interface exhibited by the NRF 358), Nnssf 364H (a service-based interface exhibited by the NSSF 334), Nausf 364I (a service-based interface exhibited by the AUSF 360). Other service-based interfaces (e.g., Nudr, N5g-eir, and Nudsf) not shown in FIG. 3D can also be used.

In some aspects, the NEF 356 can provide an interface to a MEC host such as MEC host 102, which can be used to process wireless connections with the RAN 304.

Figure 4:
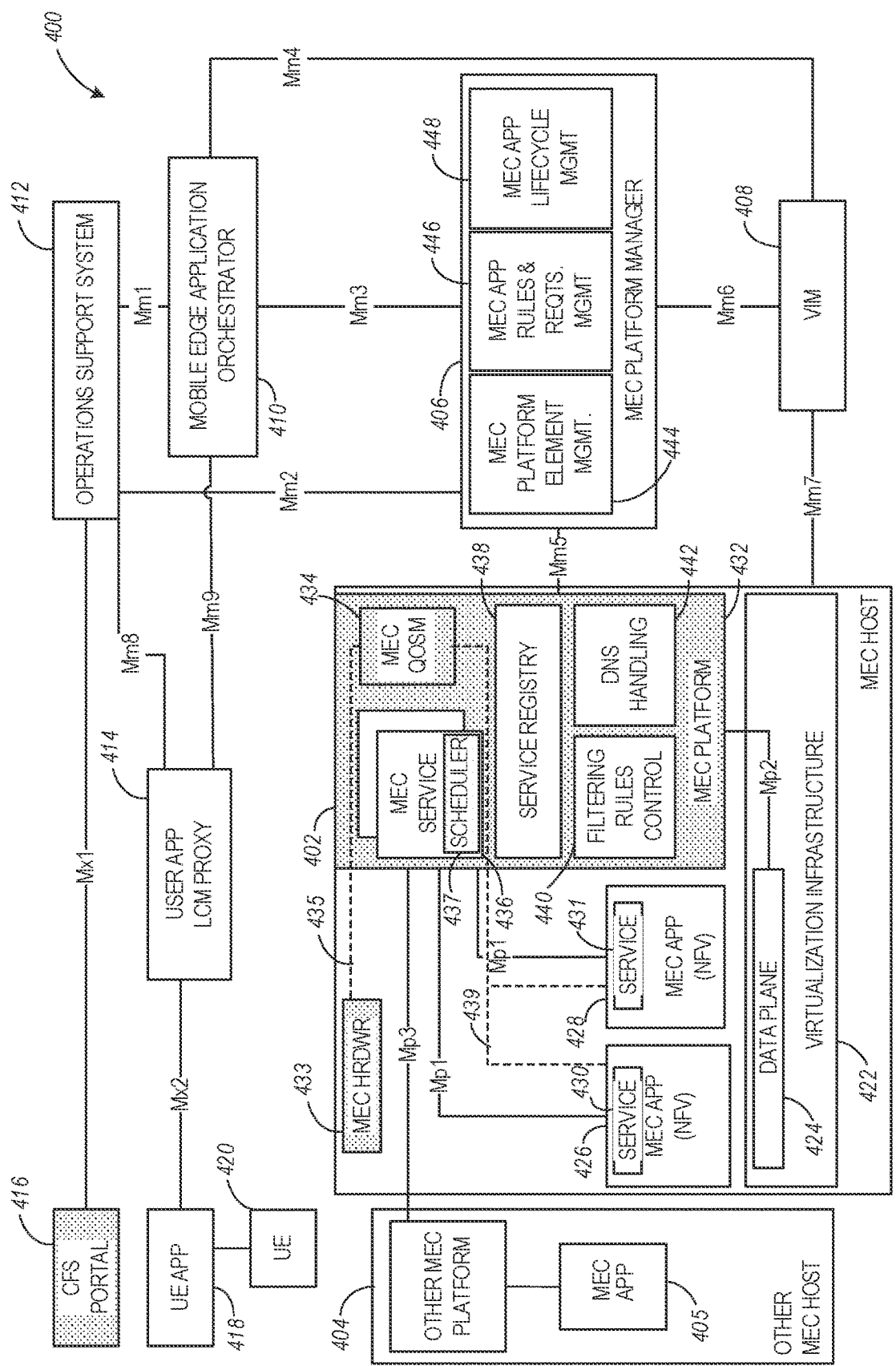
FIG. 4 illustrates a MEC network architecture modified for supporting dynamic QoS management using a MEC QoS manager, according to an example.

FIG. 4 illustrates a MEC network architecture 400 modified for supporting dynamic QoS management using a MEC QoS manager, according to an example. FIG. 4 specifically illustrates a MEC architecture 400 with MEC hosts providing functionalities in accordance with the ETSI GS MEC-003 specification, with the shaded blocks used to indicate processing aspects for the MEC architecture configuration described herein in connection with dynamic QoS management using a MEC QoS manager. Specifically, enhancements to the MEC platform 432, the MEC hardware 433, and the customer-facing service (CFS) portal 416 may be used for dynamic QoS management including managing usage of the computing resources within the MEC architecture 400. This may include provisioning of SLA and QoS definitions (e.g., CloS metrics and threshold metrics), monitoring interfaces, configuration interfaces, prediction logic, and other functionalities for implementing a MEC QoS manager for supporting QoS within the MEC architecture.

Refuting to FIG. 4, the MEC network architecture 400 can include MEC hosts 402 and 404, a virtualization infrastructure manager (VIM) 408, an MEC platform manager 406, an MEC orchestrator 410, an operations support system 412, a user app proxy 414, a UE app 418 running on UE 420, and CFS portal 416. The MEC host 402 can include a MEC platform 432 with filtering rules control module 440, a DNS handling module 442, service registry 438, and MEC services 436. The MEC services 436 can include at least one scheduler 437, which can be used to select resources for instantiating MEC apps (or NFVs) 426 and 428 upon virtualization infrastructure 422. The MEC apps 426 and 428 can be configured to provide services 430/431, which can include processing network communications traffic of different types associated with one or more wireless connections (e.g., connections to one or more RAN or core network entities as illustrated in FIGS. 1A-3D), The MEC hardware 433 and the at least one scheduler 437 can be similar to the MEC hardware 123 and the scheduler 120 discussed in connection with FIG. 1A.

The MEC platform manager 406 can include MEC platform element management module 444, MEC app rules and requirements management module 446, and MEC app lifecycle management module 448. The various entities within the MEC architecture 400 can perform functionalities as disclosed by the ETSI GS MEC-003 specification.

Figure 5:
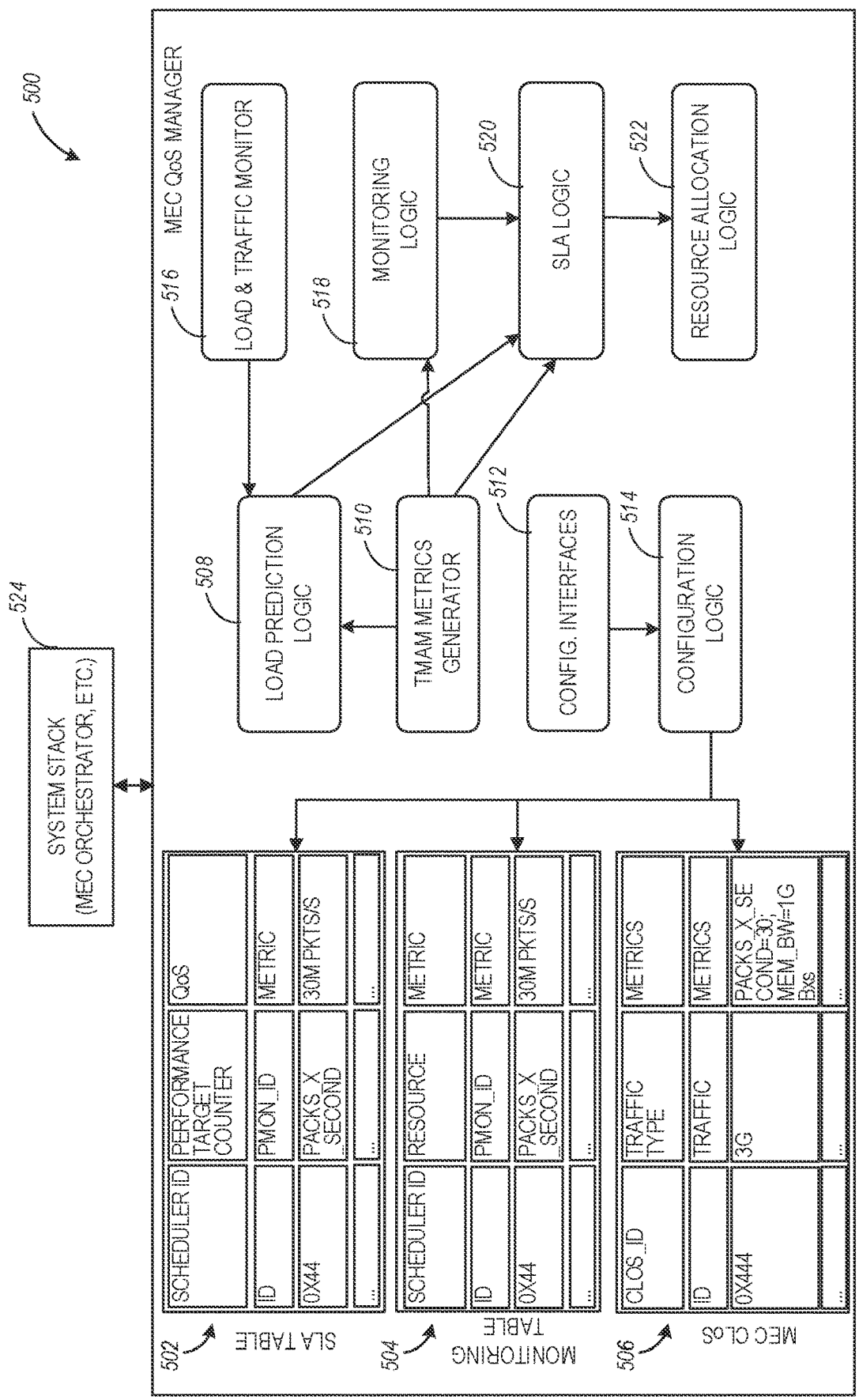
FIG. 5 illustrates a MEC QoS manager that can be used in connection with one or more network architectures described herein, according to an example.

In some aspects, the MEC platform 432 can include a MEC QoS manager 434, which is illustrated in greater detail in FIG. 5. The MEC QoS manager 434 may comprise suitable circuitry, logic, interfaces, and/or code and can be configured to perform at least the following functionalities: (1) associating CloS to schedulers based on the type of wireless traffic they process, where the CloS is defined based on one or more wireless protocols (e.g., 2G/3G/4G/5G/IoT_X, etc.); (2) monitoring and predicting the amount of load that a particular scheduler will receive; (3) monitoring the performance of a particular scheduler is achieving (e.g., by using inter-process communication (IPC) metrics or metrics exposed to and computed by the MEC host such as response latency or packets per cycle); (4) identifying if any resource is limiting or will limit the performance of the schedulers or the NFVs (e.g., using TMAM metrics) when the performance is not achieved and select the optimal CloS for a particular wireless connection handled by an NFV; (5) automatically reconfigure the amount of limiting resources associated to a scheduler or NFV using an interface to computing resources within the MEC host (e.g., a Resource Director Technology (RDT) interface); (6) if the load that a particular scheduler is receiving is lower than load parameters specified during scheduler configuration and the requested load is satisfied, the MEC QoS manager can dynamically adjust computing resources. Monitoring various metrics associated with the MEC hardware 433 or adjusting computing resources by the MEC QoS manager 434 can be performed via communication links 435. Additionally, the MEC QoS manager 434 can monitor the performance of the MA's 426 and 428 using communication link 439.

FIG. 5 illustrates a MEC QoS manager 500 that can be used in connection with one or more network architectures described herein, according to an example. Referring to FIG. 5, the MEC QoS manager 500 can include an SLA table 502, a monitoring table 504, a MEC CloS table 506, a load prediction logic 508, a TMAM metrics generator 510, configuration interfaces 512, configuration logic 514, load and traffic manager 516, monitoring logic 518, SLA logic 520, and resource allocation logic 522.

The SLA table 502 indicates what schedulers in the edge center or platform are processing what type of communication technology (e.g., 2G, 3G, 4G, etc.) and what are the QoS/SLA requirements for such technology. Within a given communication technology, different levels of QoS or SLA may be defined (e.g., low_3G, med_3G, etc.). The MEC architecture (e.g., 400) exposes a set of Class Of Services (CloS) associated with different protocols or traffic types. CloS can be configured (e.g., via table 506) and can be based on new metrics that are included in the MEC architecture and that describe the performance that a particular scheduler should be achieving (e.g., in terms of packets per second, etc.). In this regard, SLA table 502 stores threshold (or desired) metrics associated with different protocols or traffic types processed by a given scheduler (identified by the scheduler ID in the table).

The monitoring table 504 includes a list of performance metrics that are being monitored by the MEC QoS manager (e.g., by the monitoring logic 518) per each of the schedulers/NFVs. Metrics can be stored periodically within table 504 (e.g., by the monitoring logic 518) and can be used (e.g., by the SLA logic 520) to determine when a deviation from the desired metrics for a particular scheduler warrants adjustment of computing resources used by the scheduler.

The MEC CloS table 506 includes the different type of CloS for different wireless traffic supported by the MEC QoS manager 500, as well as the resources or performance metrics associated with such CloS.

The SLA logic 520 may comprise suitable circuitry, logic, interfaces and/or code and is responsible to manage the SLAs associated the different NFVs/Schedulers. Once the SLA logic 520 determines to change a CloS in order to achieve a certain type of SLA, it will configure the different computing resources using the resource allocation logic 522.

In some aspects, the SLA logic 520 may receive inputs from the TMAM metrics generator 510 as well as the monitoring logic 518 with information about the current network traffic (per scheduler), and identify that a particular scheduler/NFV needs additional computing resources or that some computing resources can be released, and thereby increasing or reducing the CloS associated to the scheduler/NFV.

In some aspects, the SLA logic 520 can use metrics from the TMAM metrics generator 510 to perform TMAM analysis to determine whether to add more or less computing resources to a particular scheduler. Similarly, the SLA logic 520 may use the SLA table 502 to determine whether to increase the CloS associated to a particular scheduler.

In some aspects, the SLA logic 520 can receive inputs from the load prediction logic 508 to notify that the current load (e.g., as measured by the load and traffic manager 516) for a particular scheduler will change (increase or decrease based on the prediction) to a new level.

The monitoring logic 518 may comprise suitable circuitry, logic, interfaces and/or code and is configured to obtain telemetry and performance data from the platform (e.g., periodically obtain scheduler-related data from the monitoring table 504 and threshold data from the SLA table 502) to identify when particular SLAs are not being satisfied by a particular scheduler. In this regard, the monitoring logic 518 can use tables 502-506 and notify the SLA logic 520 when a particular threshold is violated (i.e., a currently monitored metric is above or below a desired threshold). The monitoring logic 518 can use performance monitoring interfaces to access any of tables 502-506. In some aspects, new performance counters may be added in the MEC QoS manager 500 to identify performance at the network traffic level (e.g., packets per second metric can be added to the monitoring table).

The TMAM metrics generator 510 may comprise suitable circuitry, logic, interfaces and/or code and is configured to compute TMAM metrics to identify what are the resources that are currently limiting the performance of each of the schedulers. More specifically, the TMAM metrics generator 510 can determine whether an NFV instance is front-end bound (e.g., based on cache misses and branch re-steers), back-end bound (e.g., based on memory bound determinations such as L1_bound, L2_bound, L3_bound, memory bandwidth, memory latency, processing core bound determination, ports utilization, and so forth).

The load prediction logic 508 may comprise suitable circuitry, logic, interfaces and/or code and is responsible to analyze performance data provided by the TMAM metrics generator 510 as well as data provided by the load and traffic monitor 516. The load and traffic monitor 516 can provide every N units of time (configurable) the load that each of the registered schedulers is receiving from their corresponding wireless clients (e.g., RAN or core network entities). The load prediction logic 508 can use machine learning techniques (e.g., regression, deep neural network (PNN), and so forth) to predict a subsequent/future traffic load or resource utilization for a particular scheduler. The generated prediction can be provided to the SLA logic 520 and can be used to adjust metrics within the SLA table 502 and the MEC CloS table 506, as well as adjust resource allocation using the resource allocation logic 522.

In some aspects, the initial configuration of the tables 502-506 can be performed by the configuration logic 514 using configuration interfaces 512 that can be exposed to a network operator via the system stack 524. For example, configuration interfaces 512 can be exposed via the CFS portal 416 (FIG. 4) so that a network operator can perform the initial configuration via the operations support system 412, the MEC orchestrator 410, and the MEC platform manager 406 coupled to the MEC host via an Mm5 interface.

Even though FIG. 5 illustrates tables 502 and 504 specifying various metrics based on scheduler ID the disclosure is not limited in this regard as a particular scheduler is associated with a particular NFV instance. Consequently, NFV instance identification can be used in place of (or in addition to) the scheduler identification within tables 502 and 504.

Figure 6:
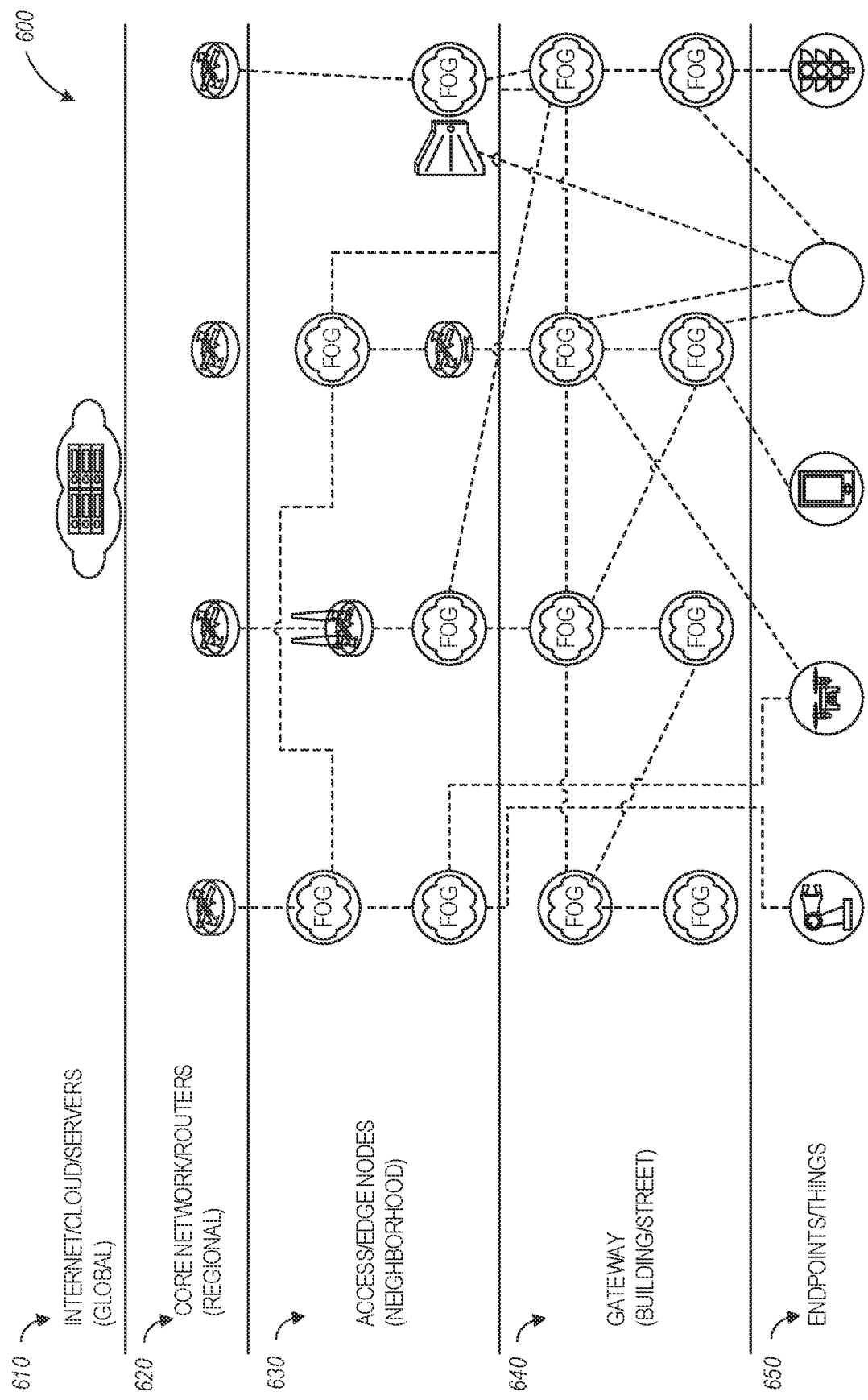
FIG. 6 illustrates a MEC and FOG network topology, according to an example.

FIG. 6 illustrates a MEC and FOG network topology 600, according to an example. Referring to FIG. 6, the network topology 600 can include a number of conventional networking layers, that can be extended through the use of a MEC QoS manager discussed herein. Specifically, the relationships between endpoints (at endpoints/things network layer 650), gateways (at gateway layer 640), access or edge computing nodes (e.g., at neighborhood nodes layer 630), core network or routers (e.g., at regional or central office layer 620), may be represented through the use of data communicated via MEC hosts that use MEC QoS managers that can be located at various nodes within the topology 600.

A FOG network (e.g., established at gateway layer 640) may represent a dense geographical distribution of near-user edge devices (e.g., FOG nodes), equipped with storage capabilities (e.g., to avoid the need to store data in cloud data centers), communication capabilities (e.g., rather than routed over the internet backbone), control capabilities, configuration capabilities, measurement and management capabilities (rather than controlled primarily by network gateways such as those in the LTE core network), among others. In this context, FIG. 6 illustrates a general architecture that integrates a number of MEC and FOG nodes—categorized in different layers (based on their position, connectivity and processing capabilities, etc.), with each node implementing a MEC V2X API that can enable a MEC app or other entity of a MEC enabled node to communicate with other nodes. It will be understood, however, that such FOG nodes may be replaced or augmented by edge computing processing nodes.

FOG nodes may be categorized depending on the topology and the layer where they are located. In contrast, from a MEC standard perspective, each FOG node may be considered as a MEC host, or a simple entity hosting a MEC app and a light-weighted MEC platform.

In an example, a MEC or FOG node may be defined as an application instance, connected to or running on a device (MEC host) that is hosting a MEC platform. Here, the application consumes MEC services and is associated with a MEC host in the system. The nodes may be migrated, associated with different MEC hosts, or consume MEC services from other (e.g., local or remote) MEC platforms.

In contrast to this approach, traditional V2V applications are reliant on remote cloud data storage and processing to exchange and coordinate information. A cloud data arrangement allows for long-term data collection and storage, but is not optimal for highly time-varying data, such as a collision, traffic light change, etc. and may fail in attempting to meet latency challenges, such as stopping a vehicle when a child runs into the street.

In some aspects, the MEC or FOG facilities can be used to locally create, maintain, and destroy MEC or FOG nodes to host data exchanged via NFVs and using resources managed by a MEC QoS manager, based upon need. Depending on the real-time requirements in a vehicular communications context, a hierarchical structure of data processing and storage nodes can be defined. For example, including local ultra-low-latency processing, regional storage, and processing as well as remote cloud data-center based storage and processing. Key Performance Indicators (KPIs) may be used to identify where sensor data is best transferred and where it is processed or stored. This typically depends on the ISO layer dependency of the data. For example, the lower layer (PHY, MAC, routing, etc.) data typically changes quickly and is better handled locally in order to meet latency requirements. Higher layer data such as Application Layer data is typically less time critical and may be stored and processed in a remote cloud data-center. In some aspects, the KPIs are metrics or operational parameters that can include spatial proximity to a V2X-related target event (e.g., accident, etc.); physical proximity to other objects (e.g., how much time is required to transfer data from one data or application object to another object); available processing power; or current load of the target (network) node and corresponding processing latency. In some aspects, the KPIs can be used to facilitate automated location and relocation of data in a MEC architecture.

Figure 7:
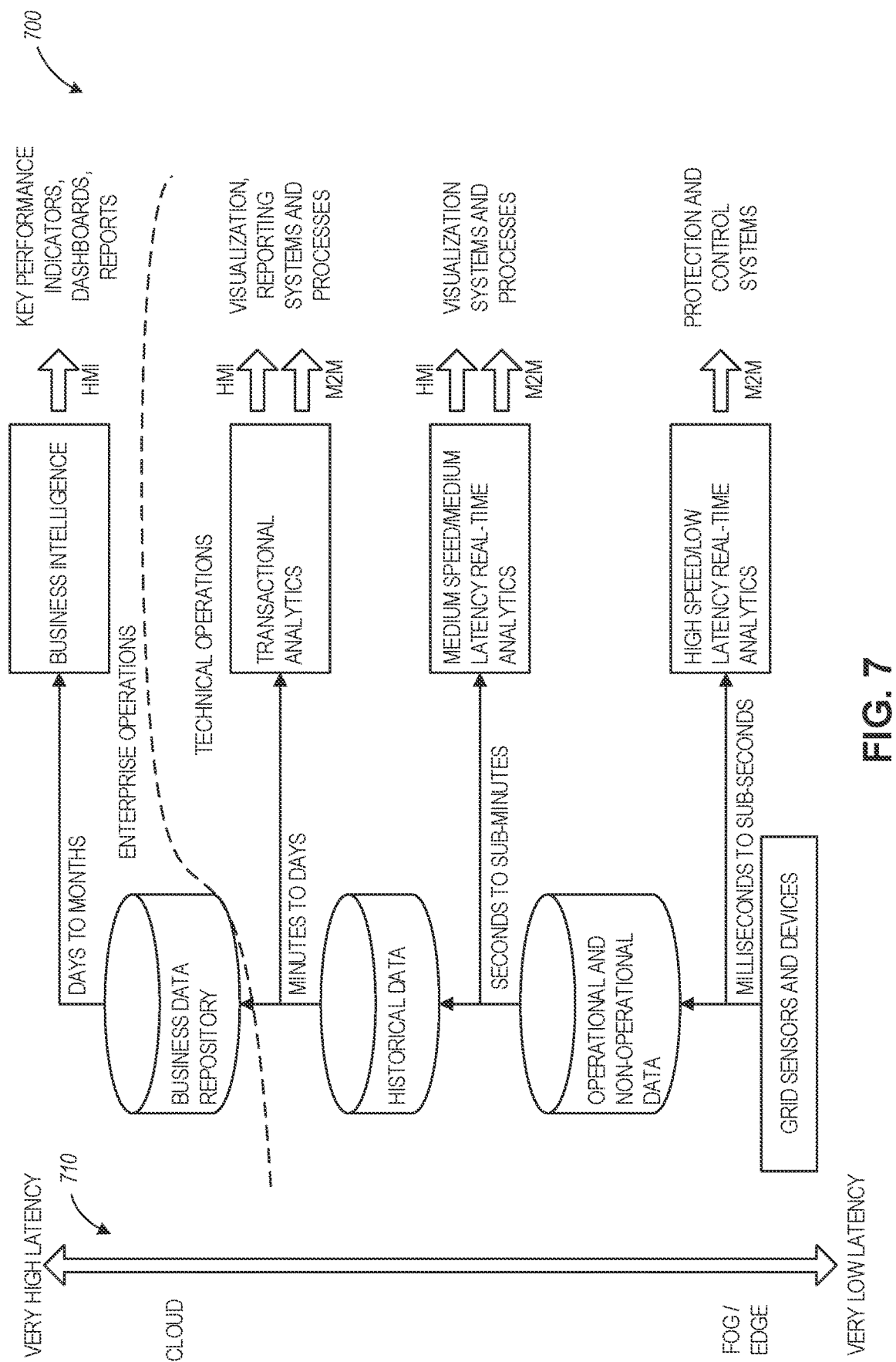
FIG. 7 illustrates the processing and storage layers in a MEC and FOG network, according to an example.

FIG. 7 illustrates the processing and storage layers in a MEC and FOG network 700, according to an example. The illustrated data storage or processing hierarchy 710 relative to the cloud and fog/edge networks allows dynamic reconfiguration of elements to meet latency and data processing parameters.

The lowest hierarchy level is on a vehicle-level. This level stores data on past observations or data obtained from other vehicles. The second hierarchy level is distributed storage across a number of vehicles. This distributed storage may change on short notice depending on vehicle proximity to each other or a target location (e.g., near an accident). The third hierarchy level is in a local anchor point, such as a MEC component, carried by a vehicle in order to coordinate vehicles in a pool of cars. The fourth level of the hierarchy is storage shared across MEC components. For example, data is shared between distinct pools of vehicles that are in the range of each other.

The fifth level of the hierarchy is fixed infrastructure storage, such as in RSUs. This level may aggregate data from entities in hierarchy levels 1-4. The sixth level of the hierarchy is storage across the fixed infrastructure. This level may, for example, be located in the Core Network of a telecommunications network, or an enterprise cloud. Other types of layers and layer processing may follow from this example.

Figure 8:
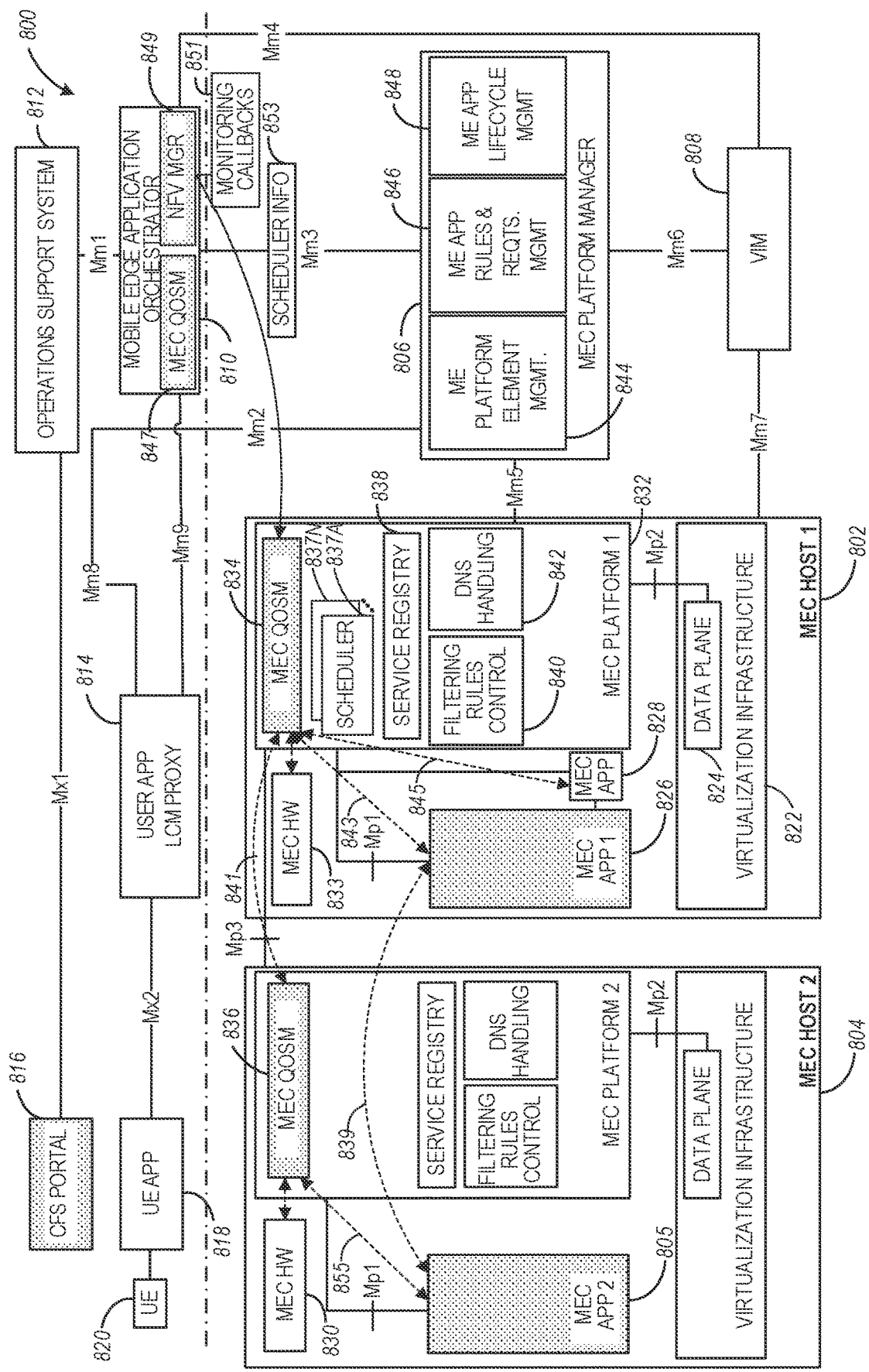
FIG. 8 illustrates a MEC architecture with multiple MEC hosts supporting dynamic QoS management using a MEC QoS manager, according to an example.

FIG. 8 illustrates a MEC architecture 800 with multiple MEC hosts supporting dynamic QoS management using a MEC QoS manager, according to an example. Referring to FIG. 8, the MEC architecture 800 can include similar components to the MEC architecture 400 of FIG. 4. FIG. 8 illustrates logical connections between various entities of the MEC architecture 800, which architecture is access-agnostic and not dependent on a particular deployment.

The MEC network architecture 800 can include MEC hosts 802 and 804, a VIM 808, a MEC platform manager 806, a MEC orchestrator 810, an operations support system 812, a user app proxy 814, a UE app 818 running on UE 820, and CFS portal 816. The MEC host 802 can include a MEC platform 832 with filtering rules control module 840, a DNS handling module 842, service registry 838, and MEC schedulers 837A, . . . , 837N (collectively, a scheduler 837). The scheduler 837 can be used to select resources for instantiating MEC apps (or NFVs) 826 and 828 upon virtualization infrastructure 822 with a data plane 824. The MEC apps 826 and 828 can be configured to provide services, which can include processing network communications traffic of different types associated with one or more wireless connections (e.g., connections to one or more RAN or core network entities as illustrated in FIGS. 1A-3D). The MEC hardware 833 and the scheduler 837 can be similar to the MEC hardware 123 and the scheduler 120 discussed in connection with FIG. 1A or the hardware 433 and scheduler 437 discussed in connection with FIG. 4.

The MEC platform manager 806 can include MEC platform element management module 844, MEC app rules and requirements management module 846, and MEC app lifecycle management module 848. The various entities within the MEC architecture 800 can perform functionalities as disclosed by the ETSI GS MEC-003 specification.

The MEC platform 832 can include a MEC QoS manager 834, which can perform functionalities discussed hereinabove in connection with FIG. 5. In some aspects, the second MEC host 804 can also implement a MEC QoS manager 836 and MEC hardware 830, which perform similar functions to the QoS manager 834 and MEC hardware 833 in MEC host 802. MEC hosts 804 and 802 can communicate with each other via an Mp1 interface. Additionally, one or more of the apps instantiated within host 802 (e.g., MEC apps/NFVs 826, 828 can communicate with one or more of the apps instantiated within host 804 (e.g., MEC app/NFV 805) via the interface between the hosts 804 and 802.

In some aspects, each of the MEC hosts 802 and 804 can be owned/managed by a different mobile services operator (while each host can be operated directly by a MEC vendor or a third party). In some aspects, MEC QoS managers 834, 836 within hosts 802, 804 can be used to provide QoS related functionalities including management of computing resources used by the NFVs instantiated in both hosts. MEC QoS manager 834 can obtain various performance metrics from the NFVs 826 and 828 via communication links 843 and 845. Similarly, MEC QoS manager 836 within MEC host 804 can obtain various performance metrics from NFV 805 via communication links 855. The obtain performance metrics can be used by the corresponding MEC QoS managers to adjust computing resources within the MEC hardware 830 and 833.

In some aspects, MEC QoS managers 836 and 834 can exchange resource utilization information, monitored performance metrics, and desired/threshold metrics for each host via communication links 841 which can include the MP3 interface between hosts 802 and 804. The exchanged information can be used by each MEC QoS manager to further adjust computing resources within its own hostbased on network resource utilization within the MEC architecture 800. Additionally, in some aspects, resource utilization information and other metrics information can be exchanged between NFVs 805 and 826 in each MEC host via communication link 839 which can include the MP3 interface between hosts 802 and 804.

In some aspects, one or more portions/modules of the MEC QoS manager 834 can be implemented within the MEC orchestrator 810 (or other entities of the MEC architecture 800). For example and as illustrated in FIG. 8, MEC QoS manager 847 is implemented within the MEC orchestrator 810, with MEC QoS manager 847 including one or more of the components of QoS manager 834. The MEC QoS manager 847 can include, for example, the SLA logic 520 and the load prediction logic 508, which can be computationally intensive. In this case, the MEC QoS manager 834 can include tables 502-506 as well as the remaining components of the QoS manager illustrated in FIG. 5.

In some aspects, the MEC orchestrator can include an NFV manager 849 comprising suitable circuitry, logic, interfaces, and/or code and configured to perform the following functionalities: (1) notifying to the QoS manager 834 (e.g., via scheduler information 853) what type of technology is being processed by a given scheduler as well as what are the performance targets for that scheduler (or corresponding NFV) (e.g., 3G connection used by a particular scheduler or NFV needs 3 Gbps throughput as a desired threshold); and (2) notifying the QoS manager 834 (e.g., via monitoring callback information 851) what are the monitoring callbacks that the NFV manager 849 is interested in obtaining back as well as the different thresholds associated with it. For example, the NFV manager 849 within the MEC orchestrator 810 may be interested to be notified when a given NFV running on a given node (a) is using more than a predefined memory bandwidth, (b) when the throughput of that NFV is less than a pre-defined threshold, or (c) the amount of I/O bandwidth is less than a pre-defined threshold.

Figure 9:
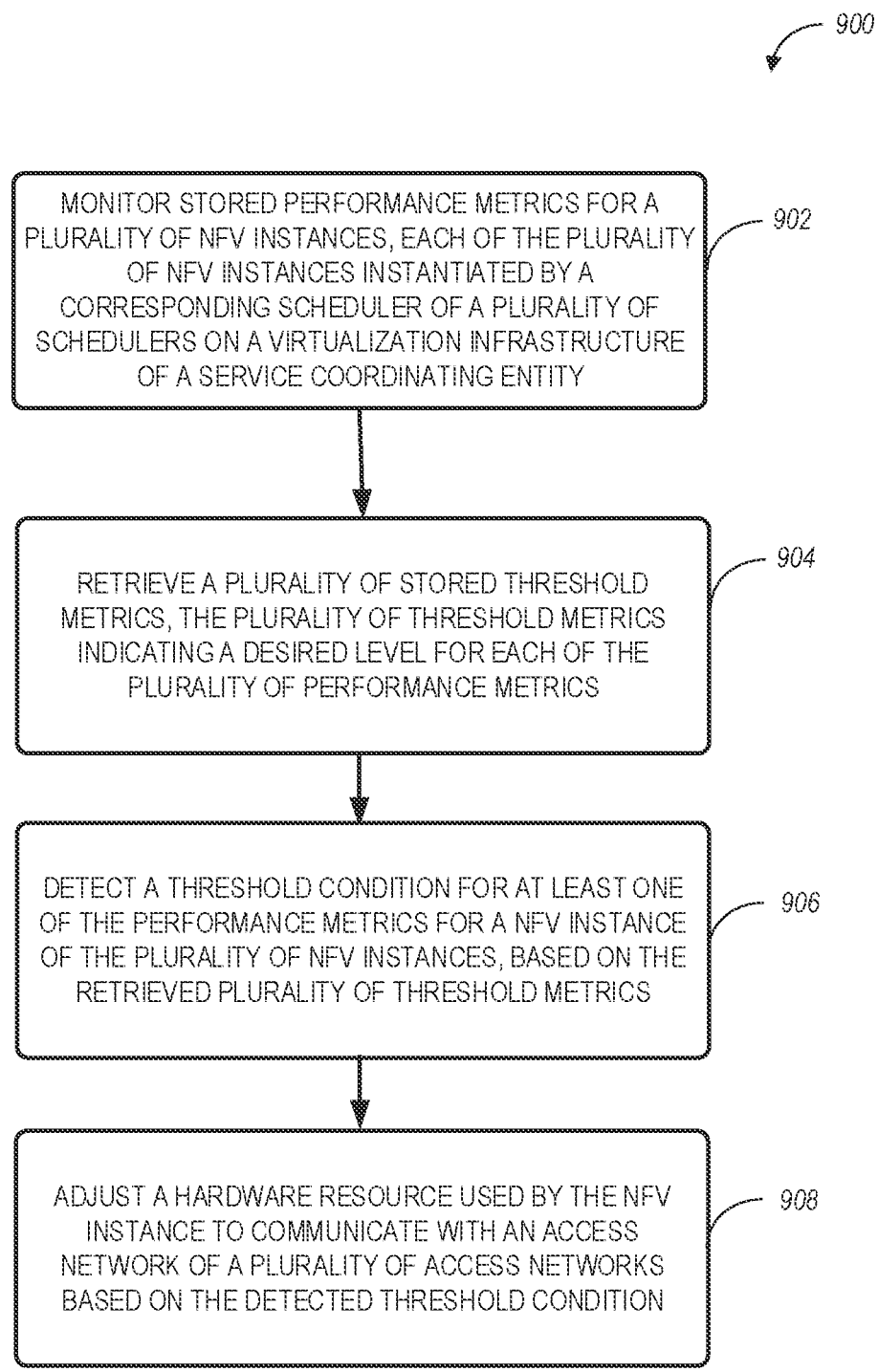
FIG. 9 illustrates a flowchart of a method for MEC QoS management, according to an example.

FIG. 9 illustrates a flowchart of a method 900 for MEC QoS management, according to an example. The method 900 includes operations 902, 904, 906, and 908. By way of example and not limitation, the method 900 is described as being performed by the MEC host 402 or 802 (which can be the same as Edge/IoT processing device 1350 of FIG. 13). At operation 902, stored performance metrics for a plurality of NFV instances are monitored, each of the plurality of NFV instances instantiated by a corresponding scheduler of a plurality of schedulers on a virtualization infrastructure of the service coordinating entity. For example, the MEC QoS manager 834 can monitor performance metrics associated with NFV instances 826 and 828 using monitoring logic 518 and table 504. At operation 904, a plurality of stored threshold metrics is retrieved, where the plurality of threshold metrics indicates the desired level for each of the plurality of performance metrics. For example, the monitoring logic 518 can retrieve threshold metrics from SLA table 502. At operation 906, a threshold condition is detected for at least one of the performance metrics for an NTIV instance of the plurality of NFV instances, based on the retrieved plurality of threshold metrics. For example, the SLA logic 520 can detect that performance metrics from the monitoring table are below or above the threshold/desired performance metrics indicated by SLA table 502. At operation 908, a hardware resource used by the NFV instance to communicate with an access network of a plurality of access networks is adjusted based on the detected threshold condition. For example, the SLA logic 520 can trigger the resource allocation logic 522 two adjust one or more computing resources used by the monitored NFV instance based on the detected threshold condition.

Even though techniques disclosed herein for QoS and computing resource management are discussed in connection with MEC-related architectures where at least one MEC entity is present, the disclosure is not limited in this regard and the disclosed techniques may be used in architectures that do not use MEC entities. For example, techniques associated with TMAM metrics monitoring and resource usage predictions can be performed in non-MEC architectures as well.

Even though techniques disclosed herein are described in connection with a MEC architecture and 5G architecture, the disclosure is not limited in this regard and the disclosed techniques can be used with other types of wireless architectures (e.g., 2G, 3G, 4G, etc.) that, use one or more MEC entities.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CPDP), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd. Generation Partnership Project Release 16), 3GPP Rel. 17 (3rd Generation Partnership Project Release 17) and subsequent Releases (such as Rel. 18, Rel. 19, etc.), 3GPP 5G, 3GPP UE Extra, LTE-Advanced Pro, UE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MIS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), etc.

Aspects described herein can be used in the context of any spectrum management scheme including a dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHZ (note: allocated for example in South Korea), 755-779 MHz and 779-787 MHz (note:

allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHZ and 5925-6425 MHz band (note: under consideration in US and EU, respectively), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (e.g., having near-global designation for Multi-Gigabit Wireless Systems (MGWS)/WiGig; in US (FCC part 15) allocated as total 14 GHz spectrum, while EU (ETSI EN 302 567 and ETSI EN 301 217-2 for fixed P2P) allocated as total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz), where particularly the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme by, e.g., introducing a hierarchical prioritization of usage for different types of users (e.g., low/medium/high priority, etc.), based on a prioritized access to the spectrum e.g. with the highest priority to tier-1 users, followed by tier-2, then tier-3 users, and so forth.

Aspects described herein can also be applied to different Single Carrier or OFDM flavors (CP-OFDM, SC-TDMA, SC-OFDM, filter bank-based multicarrier (FBMC), OFDMA, etc.) and in particular 3GPP NR (New Radio) by allocating the OFDM carrier data bit vectors to the corresponding symbol resources. Some of the features in this document are defined for the network side, such as Access Points, eNodeBs, New Radio (NR) or next generation Node-Bs (gNodeB or gNB), such as used in the context of 3GPP fifth generation (5G) communication systems, etc. Still, a User Equipment (UE) may take this role as well and act as an Access Points, eNodeBs, gNodeBs, etc. Accordingly, some or all features defined for network equipment may be implemented by a UE or a mobile computing device.

Figure 10:
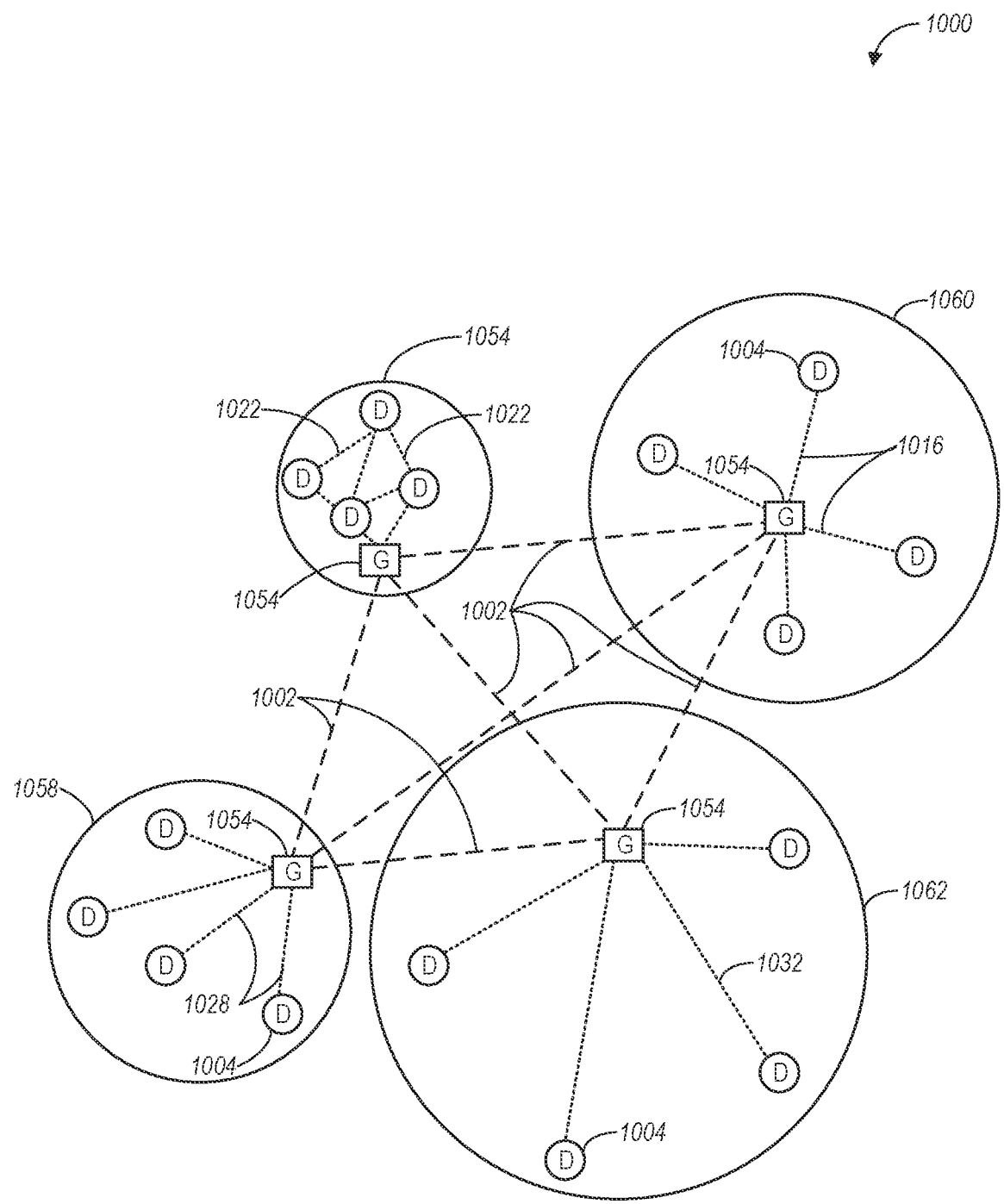
FIG. 10 illustrates a domain topology for respective internet-of-things (IoT) networks coupled through links to respective gateways, according to an example.

In further examples, the preceding examples of network communications and operations may be integrated with IoT and like device-based network architectures. FIG. 10 illustrates an example domain topology for respective IoT networks coupled through links to respective gateways. The IoT is a concept in which a large number of computing devices are interconnected to each other and to the Internet to provide functionality and data acquisition at very low levels. Thus, as used herein, an Edge/IoT processing device may include a semi-autonomous device performing a function, such as sensing or control, among others, in communication with other Edge/IoT processing devices and a wider network, such as the Internet.

MEC use cases have been envisioned to integrate into a number of network and application settings, including those to support network arrangements of IoT deployments. Edge/IoT processing devices are physical or virtualized objects that may communicate on a network (typically at the edge or endpoint of a network) and may include sensors, actuators, and other input/output components, such as to collect data or perform actions from a real-world environment. For example, Edge/IoT processing devices may include low-powered devices that are embedded or attached to everyday things, such as buildings, vehicles, packages, etc., to provide sensing, data, or processing functionality. Recently, Edge/IoT processing devices have become more popular and thus applications and use cases using these devices have proliferated.

Various standards have been proposed to more effectively interconnect and operate Edge/IoT processing devices and IoT network use cases, including those with MEC and mobile network architectures. Some of the relevant communication and network architecture standards include those distributed by groups such as ETSI, 3rd Generation Partnership Project (3GPP), Institute of Electrical and Electronics Engineers (IEEE), in addition to specialized IoT application interaction architecture and configuration standards distributed by working groups such as the Open Connectivity Foundation (OCF).

Often, Edge/IoT processing devices are limited in memory, size, or functionality, enabling larger numbers to be deployed for a similar cost to smaller numbers of larger devices. However, an Edge/IoT processing device may be a smartphone, laptop, tablet, PC, or other larger device. Further, an Edge/IoT processing device may be a virtual device, such as an application on a smartphone or another computing device. Edge/IoT processing devices may include IoT gateways, used to couple Edge/IoT processing devices to other Edge/IoT processing devices and to cloud applications, for data storage, process control, and the like.

Networks of Edge/IoT processing devices may include commercial and home automation devices, such as water distribution systems, electric power distribution systems, pipeline control systems, plant control systems, light switches, thermostats, locks, cameras, alarms, motion sensors, and the like. The Edge/IoT processing devices may be accessible through remote computers, servers, and other systems, for example, to control systems or access data.

The future growth of the Internet and like networks may involve very large numbers of Edger/IoT processing devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of Edge/IoT processing devices and networks present a number of new challenges in a heterogeneous network of connectivity comprising a combination of wired and wireless technologies.

FIG. 10 specifically provides a simplified drawing of a domain topology that may be used for a number of IoT networks comprising Edge/IoT processing devices 1004, with the IoT networks 1056, 1058, 1060, 1062, coupled through backbone links 1002 to respective gateways 1054. For example, a number of Edge/IoT processing devices 1004 may communicate with a gateway 1054, and with each other through the gateway 1054. To simplify the drawing, not every Edge/IoT processing device 1004, or communications link (e.g., link 1016, 1022, 1028, or 1032) is labeled. The backbone links 1002 may include any number of wired or wireless technologies, including optical networks, and may be part of a local area network (LAN), a wide area network (WAN), or the Internet. Additionally, such communication links facilitate optical signal paths among both Edge/IoT processing devices 1004 and gateways 1054, including the use of MUXing/deMUXing components that facilitate interconnection of the various devices.

The network topology may include any number of types of IoT networks, such as a mesh network provided with the network 1056 using Bluetooth low energy (BLE) links 1022. Other types of IoT networks that may be present include a wireless local area network (WLXN) network 1058 used to communicate with Edge/IoT processing devices 1004 through IEEE 802.11 (Wi-Fi®) links 1028, a cellular network 1060 used to communicate with Edge/IoT processing devices 1004 through an LTE/LTE-A (4G) or 5G cellular network, and a low-power wide area (LPWA) network 1062, for example, a LPW network compatible with the LoRaWan specification promulgated by the LoRa alliance, or IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IFEE 802.15.4 standard, such as Zigbee®. The respective IoT networks may also operate with the use of a variety of network and internet application protocols such as Constrained Application Protocol (CoAP). The respective IoT networks may also be integrated with coordinator devices that provide a chain of links that form the cluster tree of linked devices and networks.

Each of these IoT networks may provide opportunities for new technical features, such as those as described herein. The improved technologies and networks may enable the exponential growth of devices and networks, including the use of IoT networks into fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between Edge/IoT processing devices 1004, such as over the backbone links 1002, may be protected by a decentralized system for authentication, authorization, and accounting (AAA). In a decentralized AAA system, distributed payment, credit, audit, authorization, and authentication systems may be implemented across the interconnected heterogeneous network infrastructure. This enables systems and networks to move towards autonomous operations. In these types of autonomous operations, machines may even contract for human resources and negotiate partnerships with other machine networks. This may enable the achievement of mutual objectives and balanced service delivery against outlined, planned service level agreements as well as achieve solutions that provide metering, measurements, traceability, and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the Edge/IoT processing devices. The integration of sensory systems may enable systematic and autonomous communication and coordination of service delivery against contractual service objectives, orchestration and QoS-based swarming and fusion of resources. Some of the individual examples of network-based resource processing include the following.

The mesh network 1056, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource-based trust and service indices may be inserted to improve the data integrity, quality, assurance and deliver a metric of data confidence.

The WLAN network 1058, for instance, may use systems that perform standards conversion to provide multi-standard connectivity, enabling Edge/IoT processing devices 1004 using different protocols to communicate. Further systems may provide seamless interconnectivity across a multi-standard infrastructure comprising visible Internet resources and hidden Internet resources.

Communications in the cellular network 1060, for instance, may be enhanced by systems that offload data, extend communications to more remote devices, or both. The LPWA network 1062 may include systems that perform non-Internet protocol (IP) to IP interconnections, addressing, and routing. Further, each of the Edge/IoT processing devices 1004 may include the appropriate transceiver for wide area communications with that device. Further, each Edge/IoT processing device 1004 may include other transceivers for communications using additional protocols and frequencies. This is discussed further with respect to the communication environment and hardware of an IoT processing device depicted in FIG. 12 and FIG. 13.

Finally, clusters of Edge/IoT processing devices may be equipped to communicate with other Edge/IoT processing devices as well as with a cloud network. This may enable the Edge/IoT processing devices to form an ad-hoc network between the devices, enabling them to function as a single device, which may be termed a fog device, fog platform, or fog network. This configuration is discussed further with respect to FIG. 11 below.

Figure 11:
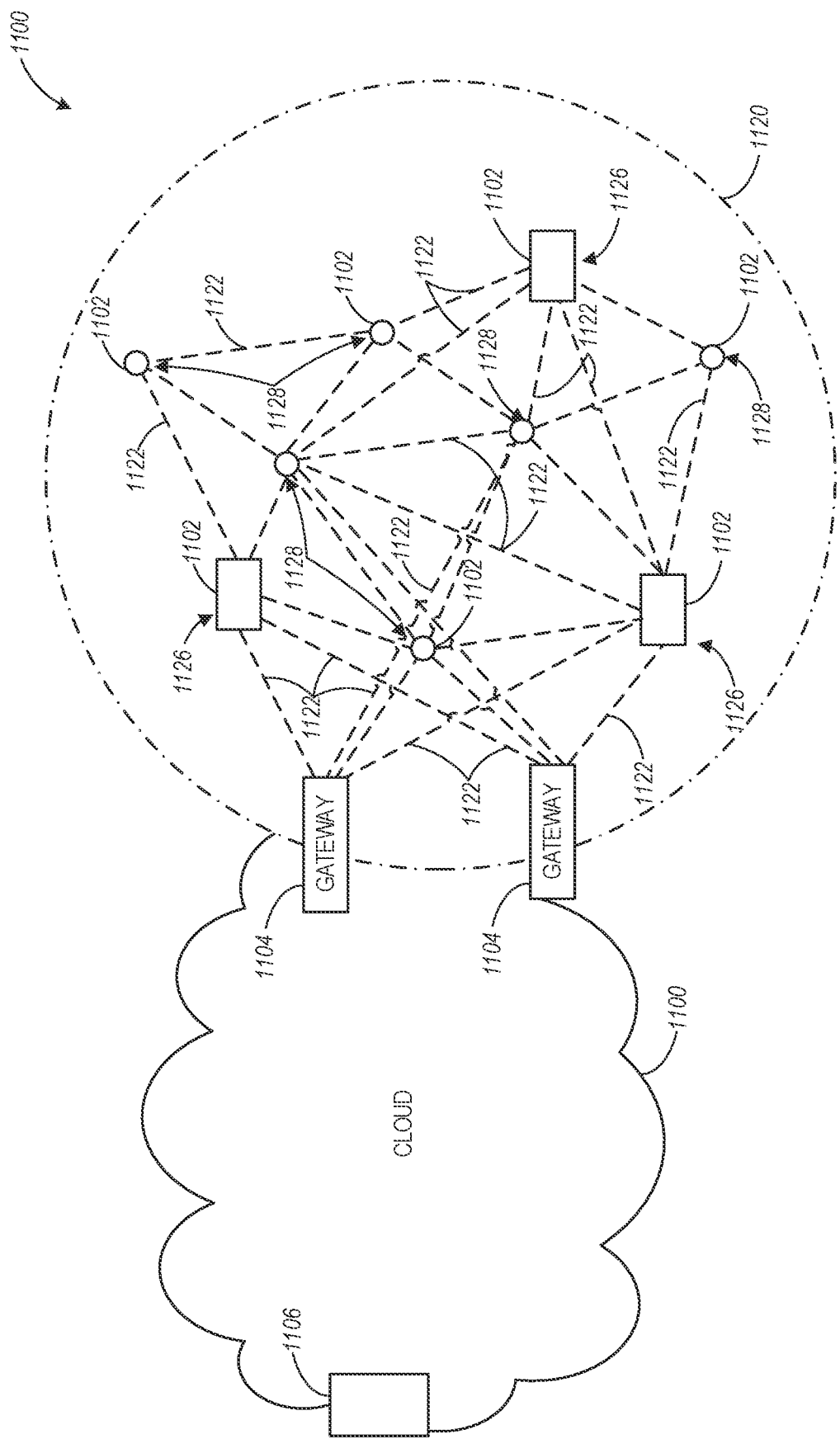
FIG. 11 illustrates a cloud-computing network in communication with a mesh network of Edge/IoT processing devices operating as fog devices at the edge of the cloud computing network, according to an example.

FIG. 11 illustrates a cloud-computing network in communication with a mesh network of Edge/IoT processing devices (devices 1102) operating as fog devices at the edge of the cloud computing network, according to an example. The mesh network of Edge/IoT processing devices may be termed a fog network 1120, established from a network of devices operating at the edge of the cloud 1100. To simplify the diagram, not every Edge/IoT processing device 1102 is labeled.

The fog network 1120 may be considered to be a massively interconnected network wherein a number of Edge/IoT processing devices 1102 are in communications with each other, for example, by radio links 1122. The fog network 1120 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge" "fog", and "cloud" are not necessarily discrete or exclusive of one another.

As an example, the fog network 1120 may be facilitated using an interconnect specification released by the Open Connectivity Foundation™ (OCF). This standard enables devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of Edge/IoT processing devices 1102 are shown in this example, gateways 1104, data aggregators 1126, and sensors 1128, although any combinations of Edge/IoT processing devices 1102 and functionality may be used. The gateways 1104 may be edge devices that provide communications between the cloud 1100 and the fog 1120 and may also provide the backend process function for data obtained from sensors 1128, such as motion data, flow data, temperature data, and the like. The data aggregators 1126 may collect data from any number of the sensors 1128 and perform the back-end processing function for the analysis. The results, raw data, or both may be passed along to the cloud 1100 through the gateways 1104. The sensors 1128 may be full Edge/IoT processing devices 1102, for example, capable of both collecting data and processing the data. In some cases, the sensors 1128 may be more limited in functionality, for example, collecting the data and enabling the data aggregators 1126 or gateways 1104 to process the data.

Communications from any of the Edge/IoT processing devices 1102 may be passed along a convenient path (e.g., a most convenient path) between any of the Edge/IoT processing devices 1102 to reach the gateways 1104. In these networks, the number of interconnections provides substantial redundancy, enabling communications to be maintained, even with the loss of a number of Edge/IoT processing devices 1102, Further, the use of a mesh network may enable Edge/IoT processing devices 1102 that are very low power or located at a distance from infrastructure to be used, as the range to connect to another Edge/IoT processing devices 1102 may be much less than the range to connect to the gateways 1104.

The fog 1120 provided from these Edge/Io717 processing devices 1102 may be presented to devices in the cloud 1100, such as a server 1106, as a single device located at the edge of the cloud 1100, e.g., a fog device. In this example, the alerts coming from the Fog device may be sent without being identified as coming from a specific Edge/IoT processing devices 1102 within the fog 1120. In this fashion, the fog 1120 may be considered a distributed platform that provides computing and storage resources to perform processing or data-intensive tasks such as data analytics, data aggregation, and machine learning, among others.

In some examples, the Edge/IoT processing devices 1102 may be configured using an imperative programming style, e.g., with each Edge/IoT processing devices 1102 having a specific function and communication partners. However, the Edge/IoT processing devices 1102 forming the fog device may be configured in a declarative programming style, enabling the Edge/IoT processing devices 1102 to reconfigure their operations and communications, such as to determine needed resources in response to conditions, queries, and device failures. As an example, a query from a user located at a server 1106 about the operations of a subset of equipment monitored by the Edge/IoT processing devices 1102 may result in the fog 1120 device selecting the Edge/IoT processing devices 1102, such as particular sensors 1128, needed to answer the query. The data from these sensors 1128 may then be aggregated and analyzed by any combination of the sensors 1128, data aggregators 1126, or gateways 1104, before being sent on by the fog 1120 device to the server 1106 to answer the query. In this example, Edge/IoT processing devices 1102 in the fog 1120 may select the sensors 1128 used based on the query, such as adding data from flow sensors or temperature sensors. Further, if some of the Edge/IoT processing devices 1102 are not operational, other Edge/IoT processing devices 1102 in the fog 1120 device may provide analogous data, if available.

In other examples, the operations and functionality described above may be embodied by an Edge/IoT processing device machine in the example form of an electronic processing system, within which a set or sequence of instructions may be executed to cause the electronic processing system to perform any one of the methodologies discussed herein, according to an example embodiment. The machine may be an Edge/IoT processing device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, these and like examples to a processor-based system shall be taken to include any set of one or more machines that are controlled by or operated by a processor, set of processors, or processing circuitry (e.g., a machine in the form of a computer, LIE, MEC processing device, IoT processing device, etc.) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 12:
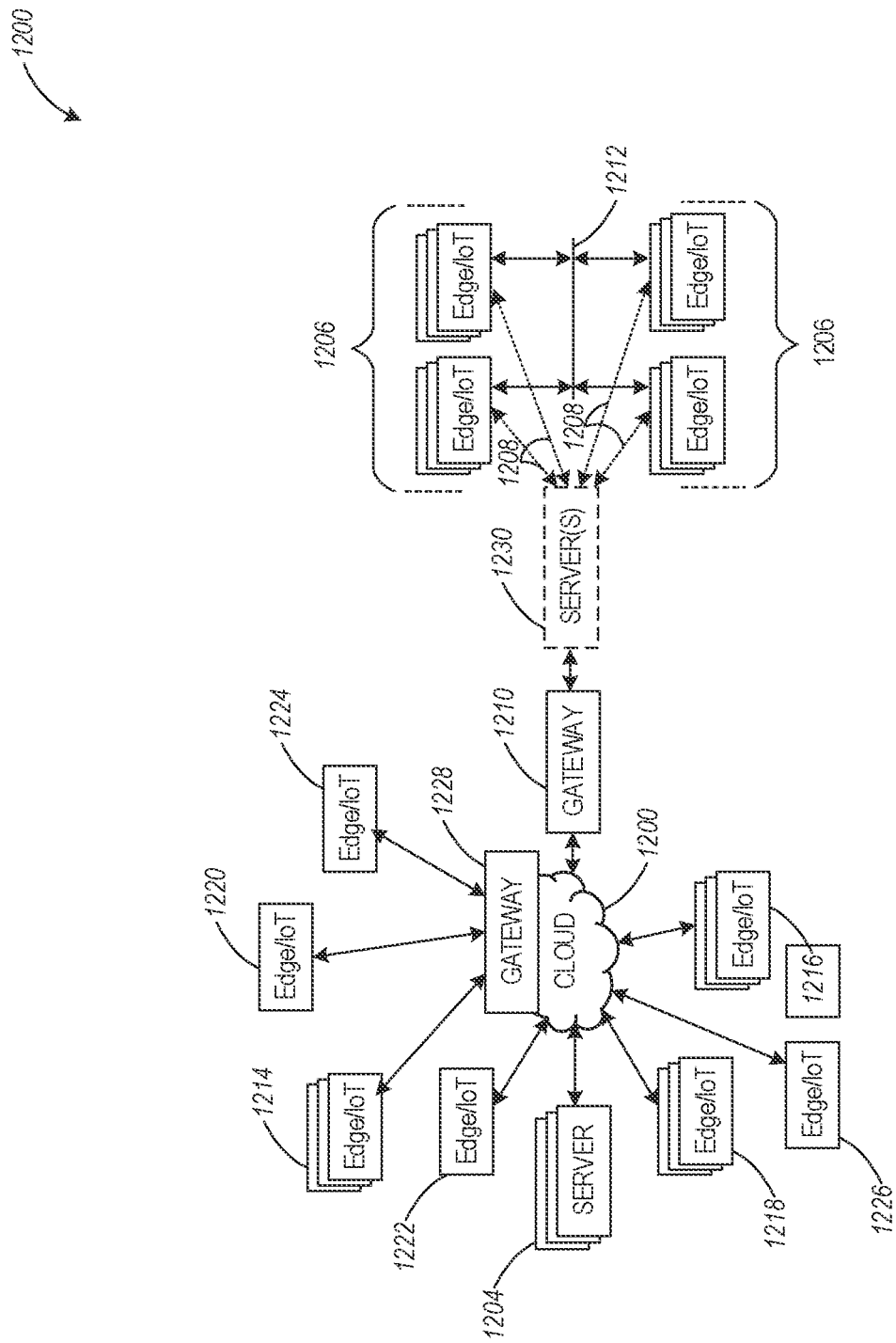
FIG. 12 illustrates a block diagram of a cloud computing network in communication with a number of Edge/IoT processing devices, according to an example.

FIG. 12 illustrates a block diagram of a cloud computing network, or cloud 1200, in communication with a number of Edge/IoT processing devices, according to an example. The cloud computing network (or "cloud") 1200 may represent the Internet or may be a local area network (LAN), or a wide area network (WAN), such as a proprietary network for a company. The Edge/IoT processing devices may include any number of different types of devices, grouped in various combinations. For example, a traffic control group 1206 may include Edge/IoT processing devices along streets in a city. These Edge/IoT processing devices may include stoplights, traffic flow monitors, cameras, weather sensors, and the like. The traffic control group 1206, or other subgroups, may be in communication with the cloud 1200 through wired or wireless links 1208, such as LIWA links, optical links, and the like. Further, a wired or wireless sub-network 1212 may allow the Edge/IoT processing devices to communicate with each other, such as through a local area network, a wireless local area network, and the like. The Edge/IoT processing devices may use another device, such as a gateway 1210 or 1228 to communicate with remote locations such as the cloud 1200; the Edge/IoT processing devices may also use one or more servers 1230 to facilitate communication with the cloud 1200 or with the gateway 1210. For example, the one or more servers 1230 may operate as an intermediate network node to support a local edge cloud or fog implementation among a local area network. Further, the gateway 1228 that is depicted may operate in a cloud-to-gateway-to-many edge devices configuration, such as with the various Edge/IoT processing devices 1214, 1220, 1224 being constrained or dynamic to an assignment and use of resources in the cloud 1200.

Other example groups of Edge/IoT processing devices may include remote weather stations 1214, local information terminals 1216, alarm systems 1218, automated teller machines 1220, alarm panels 1222, or moving vehicles, such as emergency vehicles 1224 or other vehicles 1226, among many others. Each of these Edge/IoT processing devices may be in communication with other Edge/IoT processing devices, with servers 1204, with another IoT fog platform or system, or a combination therein. The groups of Edge/IoT processing devices may be deployed in various residential, commercial, and industrial settings (including in both private or public environments).

As may be seen from FIG. 12, a large number of Edge/IoT processing devices may be communicating through the cloud 1200. This may allow different Edge/IoT processing devices to request or provide information to other devices autonomously. For example, a group of Edge/IoT processing devices (e.g., the traffic control group 1206) may request a current weather forecast from a group of remote weather stations 1214, which may provide the forecast without human intervention. Further, an emergency vehicle 1224 may be alerted by an automated teller machine 1220 that a burglary is in progress. As the emergency vehicle 1224 proceeds towards the automated teller machine 1220, it may access the traffic control group 1206 to request clearance to the location, for example, by lights turning red to block cross traffic at an intersection insufficient time for the emergency vehicle 1224 to have unimpeded access to the intersection.

Clusters of Edge/IoT processing devices, such as the remote weather stations 1214 or the traffic control group 1206, may be equipped to communicate with other Edge/IoT processing devices as well as with the cloud 1200, This may allow the Edge/IoT processing devices to form an ad-hoc network between the devices, allowing them to function as a single device, which may be termed a fog platform or system (e.g., as described above with reference to FIG. 11).

Figure 13:
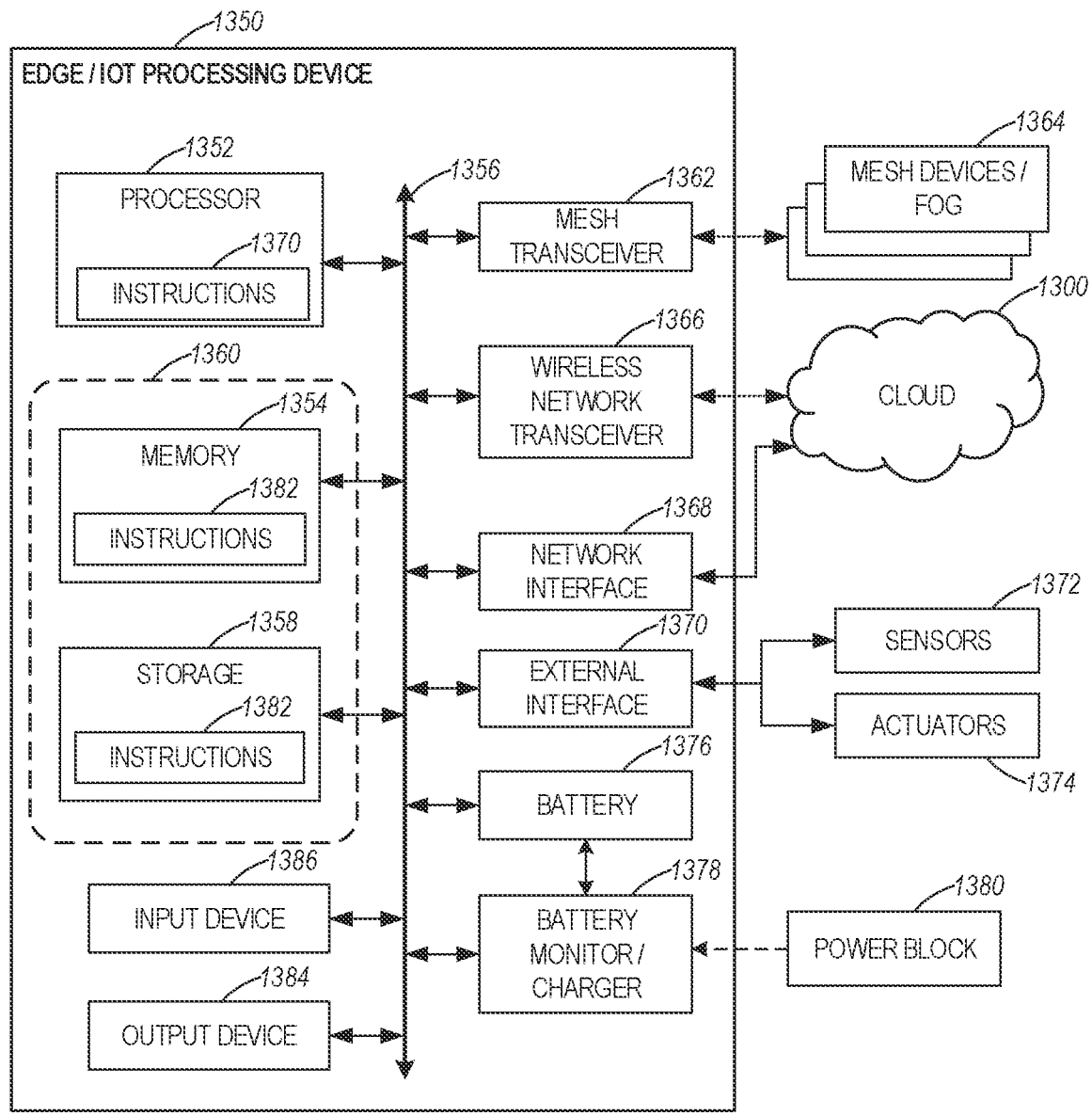
FIG. 13 is a block diagram of an example of components that may be present in an Edge/IoT processing device 1350 for implementing the techniques (e.g., operations, processes, methods, and methodologies) described herein, according to an example.

FIG. 13 is a block diagram of an example of components that may be present in an Edge/IoT processing device 1350 for implementing the techniques (e.g., operations, processes, methods, and methodologies) described herein. The Edge/IoT processing device 1350 may include any combinations of the components shown in the example or referenced in the disclosure above, and it may include any device usable with an Edge/Fog/IoT communication network or a combination of such networks. The components may be implemented as ICs, portions thereof, discrete electronic devices, or other modules, logic, hardware, software, firmware, or a combination thereof adapted in the Edge/IoT processing device 1350, or as components otherwise incorporated within a chassis of a larger system. Additionally, the block diagram of FIG. 13 is intended to depict a high-level view of components of the Edge/IoT processing device 1350. However, some of the components shown may be omitted, additional components may be present, and a different arrangement of the components shown may occur in other implementations.

The Edge/IoT processing device 1350 may include processing circuitry in the form of a processor 1352, which may be a microprocessor, a multi-core processor, a multithreaded processor, an ultra-low voltage processor, an embedded processor, or other known processing elements. The processor 1352 may be a part of a system on a chip (SoC) in which the processor 1352 and other components are formed into a single integrated circuit, or a single package, such as the Edison™ or Galileo™ SoC boards from Intel. As an example, the processor 1352 may include an Intel® Architecture Core™ based processor, such as a Quark™, an Atom™, an i3, an i5, an i7, or an MCU-class processor, or another such processor available from Intel® Corporation, Santa Clara, California. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or a customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 1352 may communicate with a system memory 1354 over an interconnect 1356 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1358 may also couple to the processor 1352 via the interconnect 1356. In an example, the storage 1358 may be implemented via a solid-state disk drive (SSDL)). Other devices that may be used for the storage 1358 include flash memory cards, such as SD cards, microSD cards, XD picture cards, and the like, and USB flash drives. In low power implementations, the storage 1358 may be on-die memory or registers associated with the processor 1352. However, in some examples, the storage 1358 may be implemented using a micro hard disk drive (HDD). Further, any number of new technologies may be used for the storage 1358 in addition to, or instead of, the technologies described, such resistance change memories, phase change memories, holographic memories, or chemical memories, among others.

The components may communicate over the interconnect 1356. The interconnect 1356 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1356 may be a proprietary bus, for example, used in a SoC based system. Other bus systems may be included, such as an I2C interface, an SPI interface, point to point interfaces, and a power bus, among others.

The interconnect 1356 may couple the processor 1352 to a mesh transceiver 1362, for communications with other mesh devices 1364. The mesh transceiver 1362 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1364. For example, a WLAN unit may be used to implement WiFi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1362 may communicate using multiple standards or radios for communications at a different range. For example, the Edge/IoT processing device 1350 may communicate with close devices, e.g., within about 10 meters, using a local transceiver based on BLE, or another low power radio, to save power. More distant mesh devices 1364, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 1366 may be included to communicate with devices or services in the cloud 1300 via local or wide area network protocols. The wireless network transceiver 1366 may be an LPWA transceiver that follows the IEEE 802.15.4, or IEEE 802.15.4g standards, among others. The Edge/IoT processing device 1350 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1362 and wireless network transceiver 1366, as described herein. For example, the radio transceivers 1362 and 1366 may include an LTE or another cellular transceiver that uses spread spectrum (SPA/SAS) communications for implementing high-speed communications. Further, any number of other protocols may be used, such as Wi-Fi® networks for medium speed communications and provision of network communications.

The radio transceivers 1362 and 1366 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology. In addition to the standards listed above, any number of satellite uplink technologies may be used for the wireless network transceiver 1366, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1368 may be included to provide a wired communication to the cloud 1300 or to other devices, such as the mesh devices 1364. The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1368 may be included to enable connecting to a second network, for example, a NIC 1368 providing communications to the cloud over Ethernet, and a second MC 1368 providing communications to other devices over another type of network.

Given the variety of types of applicable communications from the device to another component or network, applicable communications circuitry used by the device may include or be embodied by any one or more of components 1362, 1366, 1368, or 1370. Accordingly, in various examples, applicable means for communicating (e.g., receiving, transmitting, etc.) may be embodied by such communications circuitry.

The interconnect 1356 may couple the processor 1352 to an external interface 1370 that is used to connect external devices or subsystems. The external devices may include sensors 1372, such as accelerometers, level sensors, flow sensors, optical light sensors, camera sensors, temperature sensors, a global positioning system (GPS) sensors, pressure sensors, barometric pressure sensors, and the like. The external interface 1370 further may be used to connect the Edge/IoT processing device 1350 to actuators 1374, such as power switches, valve actuators, an audible sound generator, a visual warning device, and the like.

In some optional examples, various input/output (I/O) devices may be present within or connected to, the Edge/IoT processing device 1350. For example, a display or other output device 1384 may be included to show information, such as sensor readings or actuator position. An input device 1386, such as a touch screen or keypad may be included to accept input. An output device 1384 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the Edge/IoT processing device 1350.

A battery 1376 may power the Edge/IoT processing device 1350, although, in examples in which the Edge/IoT processing device 1350 is mounted in a fixed location, it may have a power supply coupled to an electrical grid. The battery 1376 may be a lithium ion battery, or a metal-air battery, such as a zinc-air battery, an aluminum-air battery, a lithium-air battery, and the like.

A battery monitor/charger 1378 may be included in the Edge/IoT processing device 1350 to track the state of charge (SoCh) of the battery 1376. The battery monitor/charger 1378 may be used to monitor other parameters of the battery 1376 to provide failure predictions, such as the state of health (SoH) and the state of function (SoF) of the battery 1376. The battery monitor/charger 1378 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1378 may communicate the information on the battery 1376 to the processor 1352 over the interconnect 1356. The battery monitor/charger 1378 may also include an analog-to-digital (ADC) converter that enables the processor 1352 to directly monitor the voltage of the battery 1376 or the current flow from the battery 1376. The battery parameters may be used to determine actions that the Edge/IoT processing device 1350 may perform, such as transmission frequency, mesh network operation, sensing frequency, and the like.

A power block 1380, or other power supply coupled to a grid, may be coupled with the battery monitor/charger 1378 to charge the battery 1376. In some examples, the power block 1380 may be replaced with a wireless power receiver to obtain the power wirelessly, for example, through a loop antenna in the Edge/IoT processing device 1350. A wireless battery charging circuit, such as an LTC4020 chip from Linear Technologies of Milpitas, California, among others, may be included in the battery monitor/charger 1378. The specific charging circuits may be selected based on the size of the battery 1376, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1358 may include instructions 1382 in the form of software, firmware, or hardware commands to implement the techniques described herein. Although such instructions 1382 are shown as code blocks included in the memory 1354 and the storage 1358, it may be understood that any of the code blocks may be replaced with hardwired circuits, for example, built into an application specific integrated circuit (ASIC).

In an example, the instructions 1382 provided via the memory 1354, the storage 1358, or the processor 1352 may be embodied as a non-transitory, machine-readable medium 1360 including code to direct the processor 1352 to perform electronic operations in the Edge/IoT processing device 1350. The processor 1352 may access the non-transitory, machine-readable medium 1360 over the interconnect 1356.

For instance, the non-transitory, machine-readable medium 1360 may be embodied by devices described for the storage 1358 or may include specific storage units such as optical disks, flash drives, or any number of other hardware devices. The non-transitory, machine-readable medium 1360 may include instructions to direct the processor 1352 to perform a specific sequence or flow of actions, for example, as described with respect to the flowchart(s) and block diagram(s) of operations and functionality depicted above. As used in, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own or may be combined in any permutation or combination with any one or more of the other examples provided below or throughout the present disclosure.

Example 1 is a device of a service coordinating entity, comprising: communications circuitry to communicate with a plurality of access networks via a corresponding plurality of network function virtualization (NFV) instances; processing circuitry; and a memory device including instructions embodied thereon, wherein the instructions, which when executed by the processing circuitry, configure the processing circuitry to perform operations to: monitor stored performance metrics for the plurality of NFV instances, each of the plurality of NFV instances instantiated by a corresponding scheduler of a plurality of schedulers on a virtualization infrastructure of the service coordinating entity; retrieve a plurality of stored threshold metrics, the plurality of threshold metrics indicating a desired level for each of the plurality of performance metrics; detect a threshold condition for at least one of the performance metrics for a NFV instance of the plurality of NFV instances, based on the retrieved plurality of threshold metrics; and adjust a hardware resource used by the NFV instance to communicate with an access network of the plurality of access networks based on the detected threshold condition.

In Example 2, the subject matter of Example 1 includes subject matter where each NFV instance of the plurality of NFV instances is provided by a Multi-Access Edge Computing (MEC) application executing on the virtualization infrastructure of the service coordinating entity.

In Example 3, the subject matter of Examples 1-2 includes, subject matter where the service coordinating entity is a Multi-Access Edge Computing (MEC) host executing the plurality of NFVI instances as MEC applications instantiated on the virtualization infrastructure.

In Example 4, the subject matter of Example 3 includes, subject matter where the MEC host is configured to operate according to a standard from a European Telecommunications Standards Institute (ETSI) MEC standards family or ETSI Network Function Virtualization (NFV) standards family.

In Example 5, the subject matter of Examples 1-4 includes, subject matter where the plurality of performance metrics comprises one or more of the following quality of service (QoS) metrics: communication throughput for at least one of the plurality of NFV instances; latency for the at least one of the plurality of NFV instances; bandwidth of a communication link between two NFV instances of the plurality of NFV instances; reliability for the at least one of the plurality of NFV instances; and power consumption of a hardware resource used by the at least one of the plurality of NFVs.

In Example 6, the subject matter of Example 5 includes, a communication interface configured to receive the plurality of performance metrics for storing as Service Level Agreement (SLA) objectives.

In Example 7, the subject matter of Examples 1-6 includes, the operations further to: determine a plurality of Top-down Microarchitecture Analysis Method (TMAM) metrics for the plurality of NFVs; and select, based on the plurality of TMAM metrics, the hardware resource from a plurality of available hardware resources for adjustment due to the threshold condition.

In Example 8, the subject matter of Example 7 includes, subject matter where the plurality of hardware resources includes allocated processing power, allocated memory, and allocated communication bandwidth.

In Example 9, the subject matter of Examples 7-8 includes, subject matter where the TMAM metrics include one or more of the following: metrics indicating a memory bound condition; metrics indicating a processing core bound condition; metrics indicating a frontend latency condition; and metrics indicating a processing misprediction condition.

In Example 10, the subject matter of Examples 7-9 includes, the operations further to: generate a prediction for hardware resource utilization by the NFV instance based at least on the TMAM metrics; and adjust the hardware resource used by the NFV instance to communicate with the access network of the plurality of access networks further based on the generated prediction.

In Example 11, the subject matter of Examples 1-10 includes the operations further to: allocate at least a portion of the memory device to store Class of Service (CloS) information for the plurality of access networks.

In Example 12, the subject matter of Example 11 includes, subject matter where the CloS information includes: an identifier of a network traffic type for at least one of the plurality of access networks; and a second plurality of threshold metrics associated with the network traffic type.

In Example 13, the subject matter of Example 12 includes, subject matter where the NFV instance is configured to communicate with the at least one of the plurality of access network via the network traffic type, and the operations further to: detect the threshold condition for at least one of the performance metrics for the NFV instance of the plurality of NFV instances, based on the second plurality of threshold metrics; and adjust the hardware resource used by the NFV instance to communicate with the access network of the plurality of access networks based on the detected threshold condition.

In Example 14, the subject matter of Examples 1-13 includes, subject matter where to detect the threshold condition, the processing circuitry is further to: detect the at least one of the performance metrics for the NFV instance is below a corresponding threshold metric of the plurality of threshold metrics.

In Example 15, the subject matter of Examples 1-14 includes, subject matter where each of the plurality of access networks is a wireless network operating according to a 3GPP standards family.

Example 16 is at least one non-transitory machine-readable storage medium including instructions, subject matter where the instructions, when executed by a processing circuitry of a service coordinating entity, cause the processing circuitry to perform operations comprising: monitoring stored performance metrics for the plurality of NFV instances, each of the plurality of NFV instances instantiated by a corresponding scheduler of a plurality of schedulers on a virtualization infrastructure of the service coordinating entity; retrieving a plurality of stored threshold metrics, the plurality of threshold metrics indicating a desired level for each of the plurality of performance metrics; detecting a threshold condition for at least one of the performance metrics for a NFV instance of the plurality of NFV instances, based on the retrieved plurality of threshold metrics; and adjusting a hardware resource used by the NFV instance to communicate with an access network of the plurality of access networks based on the detected threshold condition.

In Example 17, the subject matter of Example 16 includes, subject matter where the plurality of performance metrics comprises one or more of the following quality of service (QoS) metrics: communication throughput for at least one of the plurality of NFV instances; latency for the at least one of the plurality of NFV instances; bandwidth of a communication link between two NFV instances of the plurality of NFV instances; reliability for the at least one of the plurality of NFV instances; and power consumption of a hardware resource used by the at least one of the plurality of NFVs.

In Example 18, the subject matter of Examples 16-17 includes, subject matter where the instructions further cause the processing circuitry to perform operations comprising: receiving the plurality of performance metrics for storing as Service Level Agreement (SLA) objectives.

In Example 19, the subject matter of Examples 16-18 includes, subject matter where the instructions further cause the processing circuitry to perform operations comprising: determining a plurality of Top-down Microarchitecture Analysis Method (TMAM) metrics for the plurality of NFVs; and selecting, based on the plurality of TMAM metrics, the hardware resource from a plurality of available hardware resources for adjustment due to the threshold condition.

In Example 20, the subject matter of Example 19 includes, subject matter where the plurality of hardware resources includes allocated processing power, allocated memory, and allocated communication bandwidth.

In Example 21, the subject matter of Examples 16-20 includes, subject matter where the instructions further cause the processing circuitry to perform operations comprising: allocating at least a portion of the memory device to store Class of Service (CloS) information for the plurality of access networks.

In Example 22, the subject matter of Example 21 includes, subject matter where the CloS information includes: an identifier of a network traffic type for at least one of the plurality of access networks; and a second plurality of threshold metrics associated with the network traffic type.

In Example 23, the subject matter of Example 22 includes, subject matter where the NFV instance is configured to communicate with the at least one of the plurality of access network via the network traffic type, and subject matter where the instructions further cause the processing circuitry to perform operations comprising: detecting the threshold condition for at least one of the performance metrics for the NFV instance of the plurality of NFV instances, based on the second plurality of threshold metrics; and adjusting the hardware resource used by the NFV instance to communicate with the access network of the plurality of access networks based on the detected threshold condition.

Example 24 is a method, performed by a service coordinating entity connected to a plurality of access networks, the method comprising: monitoring stored performance metrics for the plurality of NFV instances, each of the plurality of NFV instances instantiated by a corresponding scheduler of a plurality of schedulers on a virtualization infrastructure of the service coordinating entity; retrieving a plurality of stored threshold metrics, the plurality of threshold metrics indicating a desired level for each of the plurality of performance metrics; detecting a threshold condition for at least one of the performance metrics for a NFV instance of the plurality of NFV instances, based on the retrieved plurality of threshold metrics; and adjusting a hardware resource used by the NFV instance to communicate with an access network of the plurality of access networks based on the detected threshold condition.

In Example 25, the subject matter of Example 24 includes, subject matter where the plurality of performance metrics comprises one or more of the following quality of service (QoS) metrics: communication throughput for at least one of the plurality of NFV instances; latency for the at least one of the plurality of NFV instances; bandwidth of a communication link between two NFV instances of the plurality of NFV instances; reliability for the at least one of the plurality of NFV instances; and power consumption of a hardware resource used by the at least one of the plurality of NFVs.

In Example 26, the subject matter of Examples 24-25 includes, receiving the plurality of performance metrics for storing as Service Level Agreement (SLA) objectives.

In Example 27, the subject matter of Examples 24-26 includes, determining a plurality of Top-down Microarchitecture Analysis Method (TMAM) metrics for the plurality of NFVs; and selecting, based on the plurality of TMAM metrics, the hardware resource from a plurality of available hardware resources for adjustment due to the threshold condition.

In Example 28, the subject matter of Example 27 includes, subject matter where the plurality of hardware resources includes allocated processing power, allocated memory, and allocated communication bandwidth.

In Example 29, the subject matter of Examples 27-28 includes, deallocating at least a portion of the hardware resource from at least a second NFV instance of the plurality of NFV instances; and allocating the deallocated portion of the hardware resource for use by the NFV instance to communicate with the access network.

In Example 30, the subject matter of Examples 24-29 includes, allocating at least a portion of a memory device of the service coordinating entity to store Class of Service (CloS) information for the plurality of access networks.

In Example 31, the subject matter of Example 30 includes, subject matter where the CloS information includes: an identifier of a network traffic type for at least one of the plurality of access networks; and a second plurality of threshold metrics associated with the network traffic type.

In Example 32, the subject matter of Example 31 includes, subject matter where the NFV instance is configured to communicate with the at least one of the plurality of access network via the network traffic type, and the method further comprises: detecting the threshold condition for at least one of the performance metrics for the NFV instance of the plurality of NFV instances, based on the second plurality of threshold metrics; and adjusting the hardware resource used by the NFV instance to communicate with the access network of the plurality of access networks based on the detected threshold condition.

Example 33 is an apparatus comprising means for performing any of the methods of Examples 24 to 32.

Example 34 is at least one machine-readable storage medium including instructions, subject matter where the instructions, when executed by a processing circuitry of a computing device, cause the processing circuitry to perform operations of any of Examples 24 to 32.

Example 35 is a system, comprising: a first Multi-Access Edge Computing (MEC) entity, comprising communication circuitry to communicate via one or more access networks of a plurality of available access networks, and processing circuitry configured to: monitor stored performance metrics for the plurality of NFV instances, each of the plurality of NFV instances instantiated by a corresponding scheduler of a plurality of schedulers on a virtualization infrastructure of the first MEC entity; retrieve a plurality of stored threshold metrics, the plurality of threshold metrics indicating a desired level for each of the plurality of performance metrics; and detect a threshold condition for at least one of the performance metrics for a NFV instance of the plurality of NFV instances, based on the retrieved plurality of threshold metrics; and a second MEC entity, comprising communication circuitry to communicate with the first MEC entity via the one or more access networks, and processing circuitry configured to: receive an indication of the detected threshold condition from the first MEC entity; and adjust a hardware resource used by the NFV instance in the first MEC entity to communicate with an access network of the plurality of access networks based on the detected threshold condition.

In Example 36, the subject matter of Example 35 includes, subject matter where each NFV instance of the plurality of NFV instances is provided by a MEC application executing on the virtualization infrastructure of the first MEC entity.

In Example 37, the subject matter of Examples 35-36 includes, subject matter where the first MEC entity is a MEC host executing the plurality of NFV instances as MEC applications instantiated on the virtualization infrastructure.

In Example 38, the subject matter of Examples 35-37 includes, subject matter where the second MEC entity is a MEC orchestrator.

In Example 39, the subject matter of Examples 35-38 includes, subject matter where the second MEC entity is a MEC platform manager coupled to the first MEC entity via an Mm5 interface.

In Example 40, the subject matter of Examples 35-39 includes, subject matter where the first MEC entity and the second MEC entity is configured to operate according to a standard from a European Telecommunications Standards Institute (ETSI) MEC standards family.

In Example 41, the subject matter of Examples 35-40 includes, subject matter where the processing circuitry of the first MEC entity is configured to allocate at least a portion of a memory device of the first MEC entity to store Class of Service (CloS) information for the plurality of access network; subject matter where the CloS information includes an identifier of a network traffic type for at least one of the plurality of access networks and a second plurality of threshold metrics associated with the network traffic type.

In Example 42, the subject matter of Example 41 includes, subject matter where the processing circuitry of the second MEC entity is configured to cause communicating of the second plurality of threshold metrics to the first MEC entity.

In Example 43, the subject matter of Examples 41-42 includes, subject matter where the NIN instance is configured to communicate with the at least one of the plurality of access network via the network traffic type, and processing circuitry of the first MEC entity is configured to detect the threshold condition for at least one of the performance metrics for the NFV instance of the plurality of NFV instances, based on the second plurality of threshold metrics; and cause communicating the indication of the detected threshold condition to the second MEC entity.

In Example 44, the subject matter of Examples 35-43 includes, subject matter where the processing circuitry of the second MEC entity is configured to cause communicating of the performance metrics for the plurality of NFV instances and the plurality of threshold metrics to the first MEC entity for storage.

In Example 45, the subject matter of Examples 35-44 includes, subject matter where the processing circuitry of the second MEC entity is configured to receive a plurality of Top-down Microarchitecture Analysis Method (TMAM) metrics for the plurality of NFVs from the first MEC entity; and select, based on the plurality of TMAM metrics, the hardware resource from a plurality of available hardware resources for adjustment due to the threshold condition.

In Example 46, the subject matter of Example 45 includes, subject matter where the plurality of hardware resources includes allocated processing power, allocated memory, and allocated communication bandwidth.

In Example 47, the subject matter of Examples 45-46 includes, subject matter where during the adjustment, the processing circuitry of the second MEC entity is configured to de-allocate at least a portion of the hardware resource from at least a second NFV instance of the plurality of NFV instances; and allocate the deallocated portion of the hardware resource for use by the NFV instance to communicate with the access network.

Example 48 is a device of a service coordinating entity, comprising: communications circuitry to communicate with a plurality of access networks via a corresponding plurality of network function virtualization (NFV) instances; processing circuitry; and a memory device configured to store: a first table with performance metrics for the plurality of NFV instances; a second table with a plurality of threshold metrics, the plurality of threshold metrics indicating a desired level for each of the plurality of performance metrics; a third table with Class of Service (CloS) information for the plurality of access networks; and instructions embodied thereon, subject matter where the instructions, which when executed by the processing circuitry, configure the processing circuitry to perform operations to: periodically monitor the stored performance metrics for the plurality of NFV instances, each of the plurality of NFV instances instantiated by a corresponding scheduler of a plurality of schedulers on a virtualization infrastructure of the service coordinating entity; detect a threshold condition for at least one of the performance metrics for a NFV instance of the plurality of NFV instances, based on one or both of the plurality of threshold metrics stored in the second table and the CloS information stored in the third table; and dynamically adjust a hardware resource used by the NFV instance to communicate with an access network of the plurality of access networks based on the detected threshold condition.

In Example 49, the subject matter of Example 48 includes, subject matter where the CloS information includes: an identifier of a network traffic type for at least one of the plurality of access networks; and a second plurality of threshold metrics associated with the network traffic type.

In Example 50, the subject matter of Example 49 includes, subject matter where the NFV instance is configured to communicate with the at least one of the plurality of access network via the network traffic type, and the operations further to: detect the threshold condition for at least one of the performance metrics for the NFV instance of the plurality of NFV instances, based on the second plurality of threshold metrics; and adjust the hardware resource used by the NFV instance to communicate with the access network of the plurality of access networks based on the detected threshold condition.

In Example 51, the subject matter of Examples 49-50 includes, a configuration interface to receive the plurality of threshold metrics for storing in the second table and the CloS information for storing in the third table.

In Example 52, the subject matter of Examples 48-51 includes, the operations further to: determine a plurality of Top-down Microarchitecture Analysis Method (TMAM) metrics for the plurality of NFVs; and select, based on the plurality of TMAM metrics, the hardware resource from a plurality of available hardware resources for adjustment due to the threshold condition.

In Example 53, the subject matter of Example 52 includes, subject matter where the plurality of hardware resources includes allocated processing power, allocated memory, and allocated communication bandwidth.

In Example 54, the subject matter of Examples 52-53 includes the operations further to: generate a prediction for hardware resource utilization by the NFV instance based at least on the TMAM metrics; and adjust the hardware resource used by the NFV instance to communicate with the access network of the plurality of access networks further based on the generated prediction.

In Example 55, the subject matter of Examples 48-54 includes, subject matter where each NFV instance of the plurality of NFV instances is provided by a Multi-Access Edge Computing (MEC) application executing on the virtualization infrastructure of the service coordinating entity.

In Example 56, the subject matter of Examples 48-55 includes, subject matter where the service coordinating entity is a Multi-Access Edge Computing (MEC) host executing the plurality of NFV instances as MEC applications instantiated on the virtualization infrastructure, and subject matter where the MEC host is configured to operate according to a standard from a European Telecommunications Standards Institute (ETSI) MEC standards family.

In Example 57, the subject matter of Example 56 includes, subject matter where the instructions are stored in a MEC platform of the MEC host.

Example 58 is at least one machine-readable medium including instructions that, when executed by processing circuitry, cause the processing circuitry to perform operations to implement any of Examples 1-57.

Example 59 is an apparatus comprising means to implement any of Examples 1-57.

Example 60 is a system to implement any of Examples 1-57.

Example 61 is a method to implement any of Examples 1-57.

Example 62 is at least one machine-readable storage medium, comprising information representative of instructions that, when executed by processing circuitry, cause the processing circuitry to, perform the operations of any of Examples 1-57.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus the following claims are hereby incorporated into the Detailed Description, with each claim standing on its own as a separate aspect.

What is claimed is:

1. A computing node to implement a service coordinating entity in a wireless network, the computing node comprising:
a memory device;
communications circuitry; and
processing circuitry coupled to the communications circuitry and the memory device, the processing circuitry configured to:
monitor quality of service (QOS) metrics for a plurality of network function virtualization (NFV) instances, each of the plurality of NFV instances instantiated on a virtualization infrastructure by a corresponding scheduler of a plurality of schedulers of the service coordinating entity;
retrieve a plurality of threshold metrics, the plurality of threshold metrics associated with a network traffic type of a plurality of network traffic types processed by the plurality of NFV instances and indicating a minimum level for each of the QoS metrics, the plurality of network traffic types associated with a corresponding plurality of wireless communication technologies;
detect that at least one QoS metric of the QoS metrics for an NFV instance of the plurality of NFV instances is below a corresponding threshold metric of the plurality of threshold metrics; and
adjust a hardware resource used by the NFV instance to establish a communication session with at least a second computing node in the wireless network based on detecting that the at least one QoS metric is below the corresponding threshold metric and further based on a prediction for hardware resource utilization by the NFV instance.

2. The computing node of claim 1, wherein each NFV instance of the plurality of NFV instances is provided by a respective Multi-Access Edge Computing (MEC) application executing on the virtualization infrastructure of the service coordinating entity.

3. The computing node of claim 1, wherein the service coordinating entity is a Multi-Access Edge Computing (MEC) host executing the plurality of NFV instances as respective MEC applications instantiated on the virtualization infrastructure.

4. The computing node of claim 3, wherein the MEC host is configured to operate according to a standard from a European Telecommunications Standards Institute (ETSI) MEC standards family or ETSI NFV standards family.

5. The computing node of claim 1, wherein a QoS metric of QoS metrics comprises at least one of:
communication throughput for at least one of the plurality of NFV instances;
latency for the at least one of the plurality of NFV instances;
bandwidth of a communication link between two NFV instances of the plurality of NFV instances;
reliability for the at least one of the plurality of NFV instances; and
power consumption of a hardware resource used by the at least one of the plurality of NFV instances.

6. The computing node of claim 5, wherein the communications circuitry is configured to:
receive the QoS metrics for storing as Service Level Agreement (SLA) objectives.

7. The computing node of claim 1, wherein the processing circuitry is further configured to:
determine a plurality of Top-down Microarchitecture Analysis Method (TMAM) metrics for the plurality of NFV instances; and
select, based on the plurality of TMAM metrics, the hardware resource from a plurality of available hardware resources for adjustment.

8. The computing node of claim 7, wherein the plurality of available hardware resources includes allocated processing power, allocated memory, and allocated communication bandwidth.

9. The computing node of claim 7, wherein the TMAM metrics include one or more of the following:
metrics indicating a memory bound condition;
metrics indicating a processing core bound condition;
metrics indicating a frontend latency condition; and
metrics indicating a processing misprediction condition.

10. The computing node of claim 7, wherein the processing circuitry is further configured to:
generate the prediction for hardware resource utilization by the NFV instance based at least on the TMAM metrics; and
adjust the hardware resource used by the NFV instance to communicate with the wireless network further based on the generated prediction.

11. The computing node of claim 1, wherein the processing circuitry is further configured to:
allocate at least a portion of the memory device to store Class of Service (CloS) information for the wireless network.

12. The computing node of claim 11, wherein the CloS information includes:
an identifier of at least one of the network traffic types associated with the wireless network; and
a second plurality of threshold metrics associated with the at least one of the plurality of network traffic types.

13. The computing node of claim 12, wherein the NFV instance is configured to communicate with the wireless network via the at least one of the plurality of network traffic types, and wherein the processing circuitry is further configured to:
detect the at least one QoS metric for the NFV instance is below a threshold metric of the second plurality of threshold metrics; and
adjust the hardware resource used by the NFV instance to communicate with the wireless network based on detecting the at least one QoS metric is below the threshold metric of the second plurality of threshold metrics.

14. At least one non-transitory machine-readable storage medium including instructions, wherein the instructions, when executed by a processing circuitry of a service coordinating entity in a wireless network, cause the processing circuitry to perform operations comprising:
monitoring quality of service (QOS) metrics for a plurality of network function virtualization (NFV) instances, each of the plurality of NFV instances instantiated on a virtualization infrastructure by a corresponding scheduler of a plurality of schedulers of the service coordinating entity;
retrieving a plurality of threshold metrics, the plurality of threshold metrics associated with a network traffic type of a plurality of network traffic types processed by the plurality of NFV instances and indicating a minimum level for each of the QoS metrics, the plurality of network traffic types associated with a corresponding plurality of wireless communication technologies;

detecting that at least one QoS metric of the QoS metrics for an NFV instance of the plurality of NFV instances is below a corresponding threshold metric of the plurality of threshold metrics; and adjusting a hardware resource used by the NFV instance to establish a communication session with at least a second computing node in the wireless network based on detecting that the at least one QoS metric is below the corresponding threshold metric and further based on a prediction for hardware resource utilization by the NFV instance.

15. The at least one non-transitory machine-readable storage medium of claim 14, wherein the service coordinating entity is a Multi-Access Edge Computing (MEC) host executing the plurality of NFV instances as respective MEC applications instantiated on the virtualization infrastructure.

16. The at least one non-transitory machine-readable storage medium of claim 15, wherein the MEC host is configured to operate according to a standard from a European Telecommunications Standards Institute (ETSI) MEC standards family or ETSI NFV standards family.

17. The at least one non-transitory machine-readable storage medium of claim 14, wherein a QoS metric of QOS metrics comprises at least one of:
  communication throughput for at least one of the plurality of NFV instances;
  latency for the at least one of the plurality of NFV instances;
  bandwidth of a communication link between two NFV instances of the plurality of NFV instances;
  reliability for the at least one of the plurality of NFV instances; and
  power consumption of a hardware resource used by the at least one of the plurality of NFV instances.

18. The at least one non-transitory machine-readable storage medium of claim 17, the operations further comprising:
  receiving the QoS metrics for storing as Service Level Agreement (SLA) objectives.

19. The at least one non-transitory machine-readable storage medium of claim 14, the operations further comprising:
  determining a plurality of Top-down Microarchitecture Analysis Method (TMAM) metrics for the plurality of NFV instances; and
  selecting, based on the plurality of TMAM metrics, the hardware resource from a plurality of available hardware resources for adjustment.

20. The at least one non-transitory machine-readable storage medium of claim 19, wherein the plurality of available hardware resources includes allocated processing power, allocated memory, and allocated communication bandwidth.

21. The at least one non-transitory machine-readable storage medium of claim 19, the operations further comprising:

generating the prediction for hardware resource utilization by the NFV instance based at least on the TMAM metrics; and adjusting the hardware resource used by the NFV instance to communicate with the wireless network further based on the generated prediction.

22. An apparatus of a service coordinating entity in a wireless network, the apparatus comprising:
  means for monitoring quality of service (QOS) metrics for a plurality of network function virtualization (NFV) instances, each of the plurality of NFV instances instantiated on a virtualization infrastructure by a corresponding scheduler of a plurality of schedulers of the service coordinating entity;
  means for retrieving a plurality of threshold metrics, the plurality of threshold metrics associated with a network traffic type of a plurality of network traffic types processed by the plurality of NFV instances and indicating a minimum level for each of the QoS metrics, the plurality of network traffic types associated with a corresponding plurality of wireless communication technologies;
  means for detecting that at least one QoS metric of the QoS metrics for an NFV instance of the plurality of NFV instances is below a corresponding threshold metric of the plurality of threshold metrics; and
  means for adjusting a hardware resource used by the NFV instance to establish a communication session with at least a second computing node in the wireless network based on detecting that the at least one QoS metric is below the corresponding threshold metric and further based on a prediction for hardware resource utilization by the NFV instance.

23. The apparatus of claim 22, wherein a QoS metric of QOS metrics comprises at least one of:
  communication throughput for at least one of the plurality of NFV instances;
  latency for the at least one of the plurality of NFV instances;
  bandwidth of a communication link between two NFV instances of the plurality of NFV instances;
  reliability for the at least one of the plurality of NFV instances; and
  power consumption of a hardware resource used by the at least one of the plurality of NFV instances.

24. The apparatus of claim 23, further comprising:
  means for receiving the QoS metrics for storing as Service Level Agreement (SLA) objectives.

25. The apparatus of claim 22, further comprising:
  means for determining a plurality of Top-down Microarchitecture Analysis Method (TMAM) metrics for the plurality of NFV instances; and
  means for selecting, based on the plurality of TMAM metrics, the hardware resource from a plurality of available hardware resources for adjustment.

* * * * *